US010554704B2

(12) United States Patent
Falk et al.

(10) Patent No.: US 10,554,704 B2
(45) Date of Patent: Feb. 4, 2020

(54) LOW LATENCY MEDIA MIXING IN PACKET NETWORKS

(71) Applicant: TELEFONAKTIEBOLAGET LM ERICSSON (PUBL), Stockholm (SE)

(72) Inventors: Tommy Falk, Spånga (SE); Jonas Lundberg, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 475 days.

(21) Appl. No.: 15/120,166

(22) PCT Filed: May 15, 2014

(86) PCT No.: PCT/SE2014/050586
§ 371 (c)(1),
(2) Date: Aug. 19, 2016

(87) PCT Pub. No.: WO2015/126301
PCT Pub. Date: Aug. 27, 2015

(65) Prior Publication Data
US 2017/0070547 A1  Mar. 9, 2017

Related U.S. Application Data

(60) Provisional application No. 61/942,684, filed on Feb. 21, 2014.

(51) Int. Cl.
*H04L 29/06* (2006.01)
*H04M 3/56* (2006.01)
(Continued)

(52) U.S. Cl.
CPC .......... *H04L 65/403* (2013.01); *H04L 1/205* (2013.01); *H04L 65/605* (2013.01); *H04L 65/80* (2013.01); *H04M 3/56* (2013.01)

(58) Field of Classification Search
CPC ....... H04L 12/1818–1881; H04L 47/15; H04L 47/18; H04L 65/403–4069; H04M 3/56–569; H04M 3/42; H04M 3/082
See application file for complete search history.

(56) References Cited

U.S. PATENT DOCUMENTS 5,682,384 A * 10/1997 Zarros ............... H04J 3/0632
370/394
6,580,694 B1 * 6/2003 Baker ................. H04L 47/18
370/252

(Continued)

FOREIGN PATENT DOCUMENTS

EP   1113657 A2   7/2001
WO  2008018065 A2  2/2008

OTHER PUBLICATIONS

"Communication Architectures and Algorithms for Media Mixing in Multimedia Conferences", by Rangan et al, published in IEEE/ACM Transactions on Networking, vol. L No. I, Feb. 1993 (Year: 1993).*

(Continued)

*Primary Examiner* — Wing F Chan
*Assistant Examiner* — Rajeshwari Krishnan
(74) *Attorney, Agent, or Firm* — Rothwell, Figg, Ernst & Manbeck, P.C.

(57) ABSTRACT

In a method in a mixing unit for mixing received data packets from a plurality of data streams, wherein the method includes the steps of receiving (M1) decoded data packets and their timing information, which timing information comprises at least a determined maximum waiting time for each decoded data packet, optimizing (M6) a waiting time for a subsequent mix of data packets based on the timing information, and mixing at least a subset of the decoded received data packets based on the optimized waiting time.

18 Claims, 17 Drawing Sheets

(51) Int. Cl.
*H04L 1/20* (2006.01)
*H04L 12/18* (2006.01)

(56) References Cited

U.S. PATENT DOCUMENTS

| | | | | |
|---|---|---|---|---|
| 6,940,826 B1* | 9/2005 | Simard | ............... | H04M 3/56 |
| | | | | 370/260 |
| 7,266,091 B2* | 9/2007 | Singh | ............... | H04M 3/567 |
| | | | | 370/260 |
| 9,521,057 B2* | 12/2016 | Klingbeil | ............ | H04L 47/2416 |
| 2002/0126626 A1* | 9/2002 | Singh | ............... | H04M 3/567 |
| | | | | 370/260 |
| 2003/0161345 A1* | 8/2003 | Flowers | ............ | H04M 3/56 |
| | | | | 370/468 |
| 2007/0133436 A1 | 6/2007 | Provino et al. | | |
| 2008/0084900 A1* | 4/2008 | Dunn | ............... | H04L 47/15 |
| | | | | 370/516 |
| 2009/0172095 A1 | 7/2009 | Moore et al. | | |
| 2013/0077538 A1 | 3/2013 | Plotnikov et al. | | |
| 2013/0169736 A1* | 7/2013 | Lindblom | ............. | H04L 65/403 |
| | | | | 348/14.02 |
| 2014/0240447 A1* | 8/2014 | Cartwright | ............ | H04M 3/569 |
| | | | | 348/14.09 |
| 2016/0295539 A1* | 10/2016 | Atti | ............... | H04W 56/0045 |

OTHER PUBLICATIONS

"Interparticipant Synchronization in Real-Time Multimedia Conferencing Using Feedback" by Zarros et al, published in IEEE/ACY! Transactions on Networking, vol. 4. No. 2, Apr. 1996 (Year: 1996).*

Google scholar search results (Year: 2019).*

International Search Report and Written Opinion issued in related International application No. PCT/SE2014/050586, dated Feb. 4, 2015, 12 pages.

* cited by examiner

LOW LATENCY MEDIA MIXING IN PACKET NETWORKS

CROSS REFERENCE TO RELATED APPLICATION(S)

This application is a 35 U.S.C. § 371 National Phase Entry Application from PCT/SE2014/050586, filed May 15, 2014, which claims priority to U.S. Application No. 61/942,684 filed Feb. 21, 2014. The above identified applications are incorporated by reference.

TECHNICAL FIELD

The proposed technology relates generally to the field of real-time communication, and particularly to a method for efficient low-latency data and/or audio and video mixing in packet-switched networks.

BACKGROUND

Conferencing capability allows for group communication and collaboration among geographically dispersed participants (also called users below). Historically, conferencing has been achieved in the Public Switched Telephone Network (PSTN) by means of a centralized conference bridge. In large-scale audio and video conferencing systems media mixers are cascaded to support large number of users connecting from different locations. To be able to maintain low end-to-end delay, each intermediate node must minimize the delay. Each node must at the same time ensure that the delay introduced is enough to generate almost degradation-free media.

In such a circuit switched network, the mixing of real-time media streams from several users can usually be performed without causing any substantial additional delay. In e.g. a voice teleconference, the individual audio samples from the participants are synchronized and arrive at regular time intervals. This means that the samples can be scheduled to be processed at regular time intervals and no additional delay is added except the time needed for the processing. The processing for a voice teleconference usually consist of determining which talkers that are active and summing the speech contribution from the active talkers.

Currently trends point towards the migration of voice communication services from the circuit-switched PSTN to non-synchronous packet-based Internet Protocol (IP) networks. This shift is motivated by a desire to provide data and voice services on a single, packet-based network infrastructure. In a packet non-synchronous network, the audio samples (or coded parameters representing the audio samples) from the participants in e.g. a voice teleconference do usually not arrive at regular time intervals due to the jitter in the transport network. Also, the speech data from the individual participants might not be sampled with exactly the same sample frequency, thus introducing a drift in the data from the participants.

In order to synchronize the speech contributions from the participants and thus making it possible to mix samples corresponding to temporally related packets from all participants, jitter buffers are typically implemented in the conference bridge on the incoming speech to cater for the varying delay of the packets. With conventional jitter buffers the size of the buffers will be at least as big as the jitter to be able to avoid late losses. Cascaded mixers will buffer the incoming media several times causing the end-to-end delay to grow.

Another solution, called early mixing, does not utilize jitter buffers at all. Instead packets are mixed as soon as all temporally related packets have arrived at the mixer. This includes setting a waiting time that takes into account the delay. Even though early mixing solutions may decrease the end-to-end delay compared to conventional static jitter buffers it will not provide an optimized solution.

Due to the above mentioned disadvantages, there is a need for a mixing solution that improves the mixing in a packet based network without introducing unnecessary delay.

SUMMARY

It is an object to provide improved mixing in a packet based conference system.

This and other objects are met by embodiments of the proposed technology.

A first aspect of the proposed technology involves a method in a mixing unit for mixing received data packets from a plurality of data streams, wherein the method comprises the steps of receiving decoded data packets and their timing information, which timing information comprises at least a determined maximum waiting time for each decoded data packet. Further, the method includes the steps of optimizing a waiting time for a subsequent mix of data packets based on the timing information, and mixing at least a subset of the decoded received data packets based on the optimized waiting time.

A second aspect of the proposed technology involves a method performed by a network node of mixing received data packets from a plurality of incoming data streams in a packet switched network, which network node comprising a mixing unit. The method includes receiving data packets on a plurality of incoming data streams and calculating a maximum waiting time for each received media packet on each received media stream, and determining, by the mixing unit, an optimal waiting time based on the maximum waiting time for a selected set of the received data packets, and controlling mixing of the selected set of data packets based on the optimal waiting time.

A third aspect of the proposed technology involves a mixing unit configured to mix received data packets, wherein the mixing unit is configured to receive decoded data packets and their timing information, which timing information comprising at least a determined maximum waiting time for each decoded data packet. Further, the mixing unit is configured to optimize a waiting time for a subsequent mix of data packets based on the timing information; and to mix at least a subset of the decoded received data packets based on the optimized waiting time.

A fourth aspect of the proposed technology involves a network node comprising a mixing unit, wherein the network node is further configured for measuring at least jitter for every received data packet of each of a plurality of incoming data streams, and for calculating a maximum waiting time for each received data packet of each of the plurality of incoming data streams based on at least the measured jitter, and for controlling mixing of at least a subset of the received data packets based at least on the calculated maximum waiting time.

Additionally, the proposed technology discloses a computer program and a carrier supporting the above described aspects.

Embodiments of the proposed technology enables/makes it possible to provide improved mixing.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

ABBREVIATIONS

FIFO First In First Out
IP Internet Protocol
NTP Network Time Protocol
PDF Probability Density Function
PSTN Public Switched Telephone Network
RRU Remote Radio Unit
RTCP RTP Control Protocol
RTP Real-time Transport Protocol
UE User Equipment

DETAILED DESCRIPTION

Throughout the drawings, the same reference numbers are used for similar or corresponding elements.

In the following description the main focus will be on mixing of media packets, such as audio and video packets, in a network node such as a conference bridge. However, the proposed technology is equally applicable to more generic data packets that do not involve audio or video packets. One such application would be a case where it is required to collect data packets from a plurality of data streams and combine those packets in some predetermined manner, e.g. by running an algorithm which needs data from each data stream in order to prepare a result. The various data streams do not necessary need to be of a same type and could potentially be prioritized based on type. A particular example of such an application would be a machine-to-machine application or some type of surveillance where information from multiple sources would need to be collected and combined with a minimum of latency.

For a better understanding of the proposed technology, it may be useful to begin with a brief overview of prior art mixing of multiple data or media streams in a conference bridge in a packet based conference system.

One method is the aforementioned implementation of jitter buffers. In order to synchronize the speech contributions from the participants e.g. media streams and thus making it possible to mix samples corresponding to temporally related packets from all participants, jitter buffers can be implemented in the conference bridge on the in-coming speech to cater for the varying delay and possible drift of the sample clocks in the users terminals. In the following description the term jitter will be used to represent the previously mentioned varying delay and possible drift of the sample clocks in the user terminals.

Figure 1:
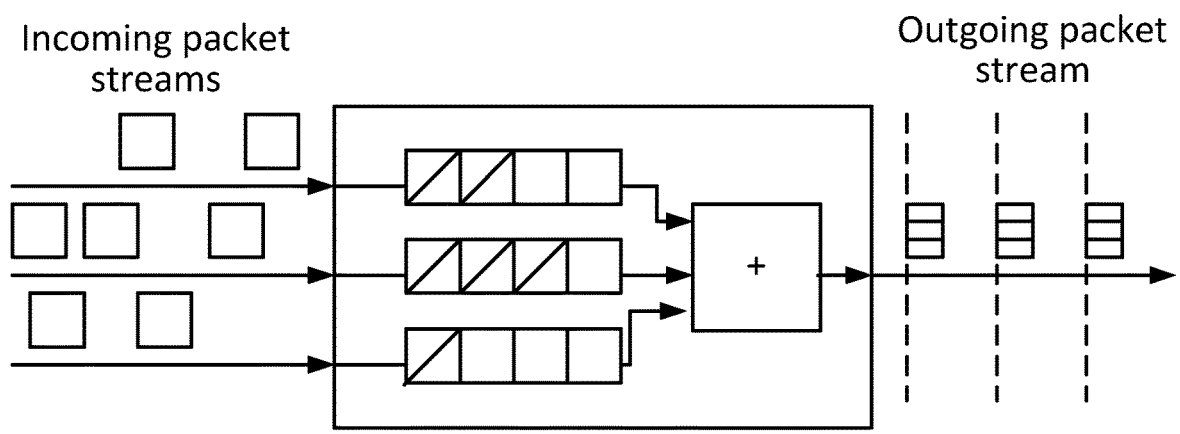
FIG. 1 illustrates a mixer with conventional jitter buffers.

By delaying the incoming packets before mixing, the mixer can generate media at the same interval as the senders. This is illustrated in FIG. 1 in which the outgoing stream is a continuous and even stream since the jitter e.g. delay has been remove by the jitter buffers. In this context the terms continuous and even indicate that outgoing packets are evenly distributed in time, as indicate by the dotted lines in FIG. 1.

Figure 2:
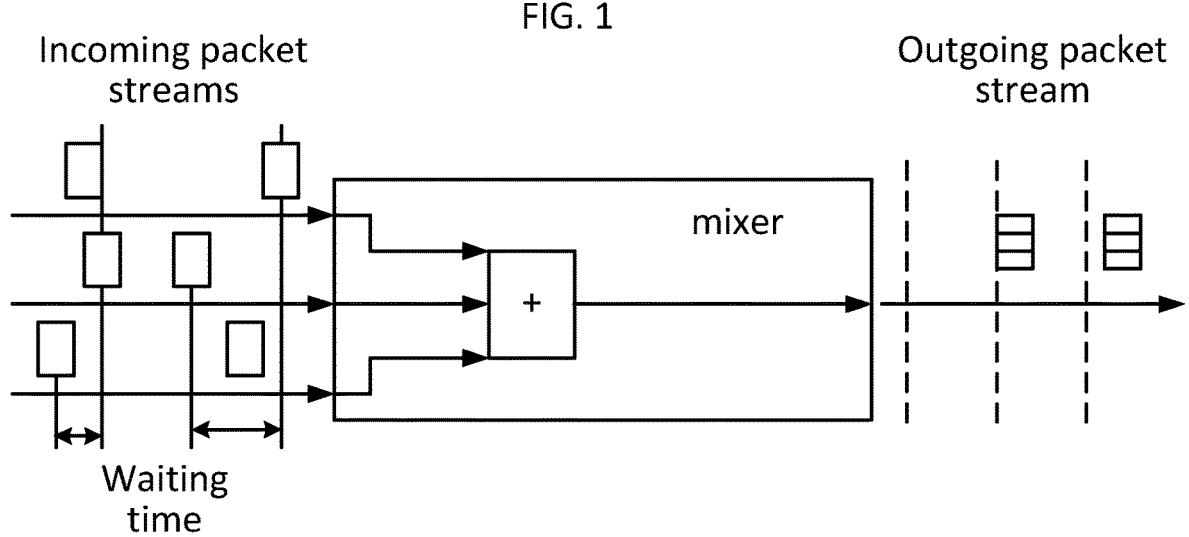
FIG. 2 illustrates a mixer without conventional jitter buffers.

Another method is the aforementioned mixing solution without jitter buffers in the conference bridge, in which the jitter is handled by the jitter buffers of the target node e.g. one of the users, and not the actual conference bridge or mixer. One way to minimize the extra delay at every mixing stage is thus using so called early mixing, where a mix is created and sent out as soon as all needed data is available. This means that the outgoing packet stream is not necessarily synchronous (see FIG. 2). The jitter of the incoming streams is not absorbed; instead the jitter buffers in the clients are doing the playback synchronization where the jitter is removed. With early mixing the outgoing stream is not even since the jitter of the incoming streams has not been removed.

Instead of using a buffer with some buffering depth, early mixing uses a maximum waiting time that determines how long the mixer will wait for data on each input. Such early mixing solutions are described e.g. in U.S. Pat. No. 6,940,826.

The incoming frames from the different streams still need to be synchronized so the timing information is kept intact, typically by comparing timestamps.

The early mixing solution, as identified by the inventors, will not be an efficient one as long as the maximum waiting time is predefined and static. The choice of maximum waiting time will typically control the trade-off between quality and delay. A too short waiting time will cause lost frames, which will impair the quality. A too long waiting time will cause excess delay. Consequently, the inventors have identified the need for a solution in which the waiting time or mixing time in the mixer is dynamically adapted based on the jitter e.g. delay and other timing information of the respective incoming data or media streams. Thereby it is possible to control and adapt the mixing without adding unnecessary delay to the network.

To further aid in the understanding of the disclosed technology, a couple of known solutions will be described below.

Figure 3:
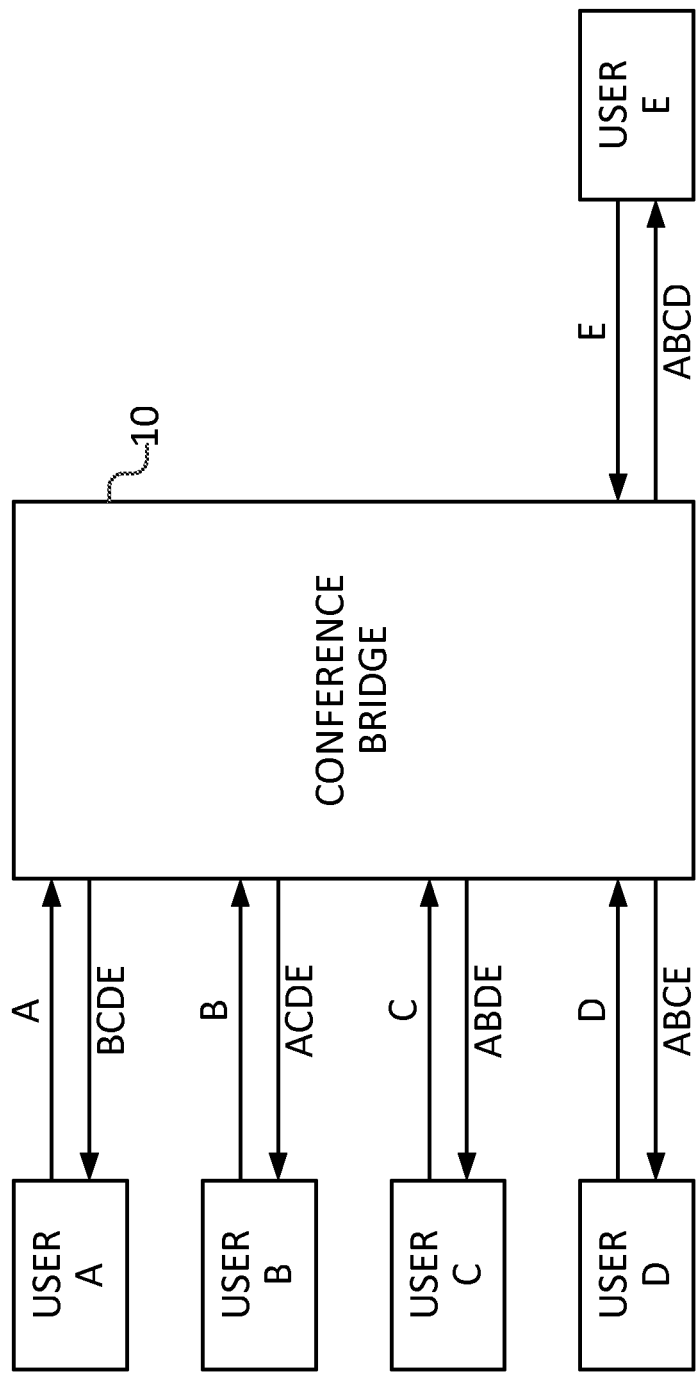
FIG. 3 illustrates a conventional conference bridge.

FIG. 3 is a simple block diagram of a network with a conference bridge 10. Users A-E each have bidirectional connections to the conference bridge 10. In one direction each user sends audio or voice packets to the conference bridge 10. In the opposite direction each user receives combined or mixed packets from the other users or participants in the conference. For example, user A sends packets A to the conference bridge 10 and receives a mix BCDE of packets from the other users. The purpose of the conference bridge is to manage received packets and perform the mixing that is relevant for each user.

Figure 4:
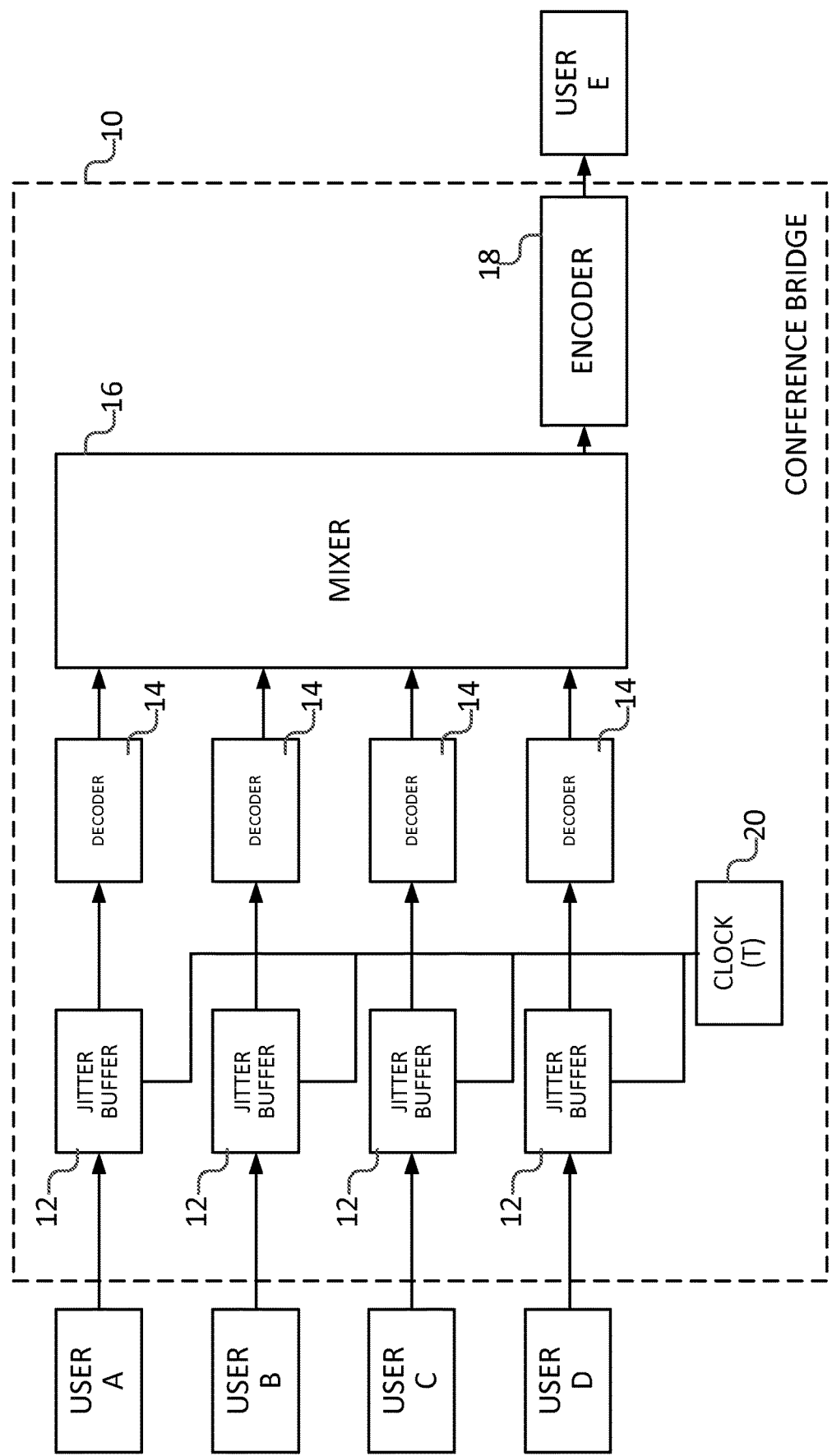
FIG. 4 illustrates a conference bridge with jitter buffers.

FIG. 4 is a more detailed block diagram of a typical prior art non-synchronous packet network with a conference bridge 10. In order to simplify the description, FIG. 4 only illustrates how packets from users A-D are mixed and forwarded to user E. The other users are managed in a similar way.

Packets from users A-D reach respective jitter buffers 12 in the conference bridge 10, where they are delayed. When the packets are released from the jitter buffers 12, they are forwarded to respective decoders 14. Decoders 14 decode the packets into samples that are forwarded to a selecting and mixing unit 16. After mixing, the resulting samples are encoded and mixed into packets in an encoder 18 and forwarded to user E. A clock unit 20 releases packets from the jitter buffers 12 at regular time instants separated by a time interval T, which corresponds to the length of a speech frame, typically 20-40 ms. The added delay in the jitter buffers is typically 1-3 time intervals T.

Figure 5:
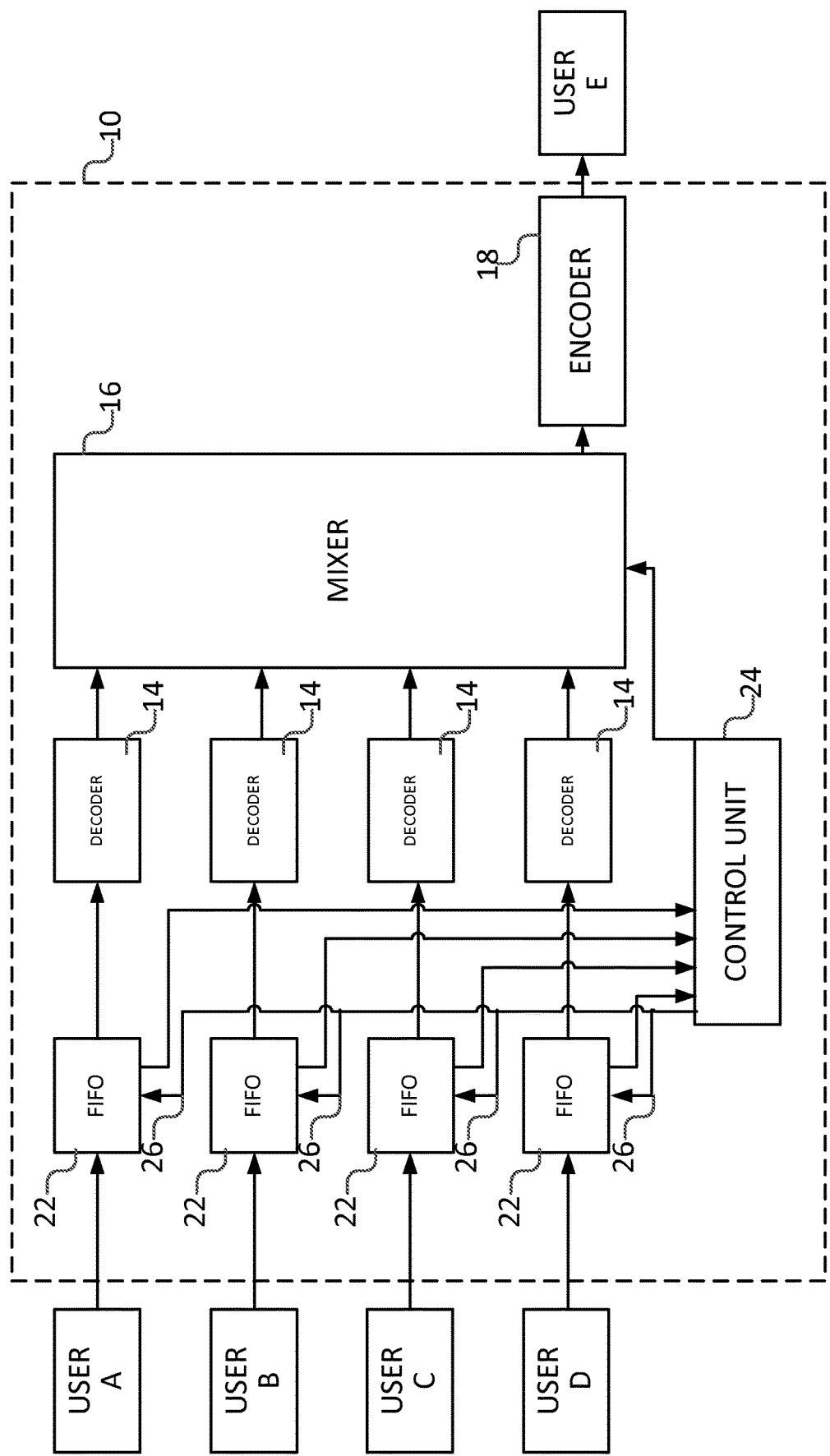
FIG. 5 illustrates a conference bridge utilizing early mixing.

FIG. 5 is a block diagram of an embodiment of a conference bridge 10 in accordance with another prior art system. Instead of forwarding packets that arrive in the conference bridge 10 to jitter buffers, as in the above described prior art, they are forwarded to queue memories or first in first out memories (FIFOs) 22 in the conference bridge 10. The queue memories 22 are controlled by a control unit 24. Control unit 24 monitors the queue memories 22 over monitor lines 26 to determine whether temporally related packets from all streams have arrived in the queue memories 22. As soon as all temporally related packets representing a given time interval have arrived, control unit 24 releases these packets to decoders 14 for decoding and subsequent mixing in unit 16.

Although the illustration in FIG. 5 discloses having decoders 14 arranged after the queue memories 22, it is evident that the decoders 14 can be placed before the queue memories 22. In the first case any error concealment can be handled by the decoders, in the second case a separate error concealment unit needs to be implemented.

As used herein, the term "wireless device" may refer to a User Equipment, UE, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units, RRUs, or the like.

As mentioned previously, the disclosed technology enables an optimized choice of waiting time for the described early mixing solution. By continuously measuring the jitter e.g. delay and other timing information on each incoming stream and calculating a waiting time that fulfills a current quality target, an optimal trade-off between quality and delay can always be provided. Furthermore, other aspects such as which clients are currently active speakers can also have an influence of over the chosen waiting time.

Some of the pre-conditions for the disclosed technology include that a mixer must be designed to handle packet-switched networks with variable delay and link losses. A mixer that is waiting for packets from several different senders must be prepared that some packets might be late or might never arrive. This is solved by defining a maximum waiting time. When the time is out, the mixer will generate a new packet. To reduce the audible effect of missing packets, the mixer has to use some sort of packet loss concealment method. This packet loss concealment or error concealment can be performed by the mixer itself, or by some separate error concealment arrangement that provides the necessary information to the mixer.

If the maximum waiting time is too long the mixer will add more latency than necessary. If the maximum waiting time is too short some packets won't make it in time causing distortion in the mixed stream. With the proposed technology the mixer can find waiting times that result in a balanced trade-off between latency and quality while still adapting to current jitter. The maximum waiting time has to be recalculated continuously e.g. for each received packet to be able to minimize the latency.

In the following embodiments the word jitter should be understood as referring to the delay and other timing information in each incoming data or media stream on each data or media stream.

The proposed technology can generally be described as a two-step procedure, in a first step of which a maximum waiting time is calculated for each received packet on each incoming media stream. Based on the maximum waiting time for a selected set of incoming packets and/or media streams, a mixing time e.g. an optimal waiting time or timeout is determined in a second step (in the mixer or in a control unit within the conference bridge or in some other separate unit) prior to generating an outgoing packet. This mixing time e.g. optimal waiting time determines how long the mixer waits before mixing temporally related packets and if necessary applies packet loss concealment if expected packets have not arrived within the timeout. The feature that the packets are temporally related means that they are based on samples generated (at the users) at approximately the same time i.e. they represent approximately simultaneous events.

According to a general embodiment, the proposed technology discloses a method performed by a network node 10 such as a conference bridge of mixing received data packets from a plurality of incoming data streams in a packet switched network, the network node includes a mixing unit. The method includes the steps of receiving data packets on a plurality of incoming data streams, and calculating a maximum waiting time for each received data or media packet on each received media stream, and determining, by the mixing unit, an optimal waiting time based on the maximum waiting time for a selected set of the received data packets, and controlling mixing according the selected set of data packets based on the determined optimal waiting time.

Figure 6:
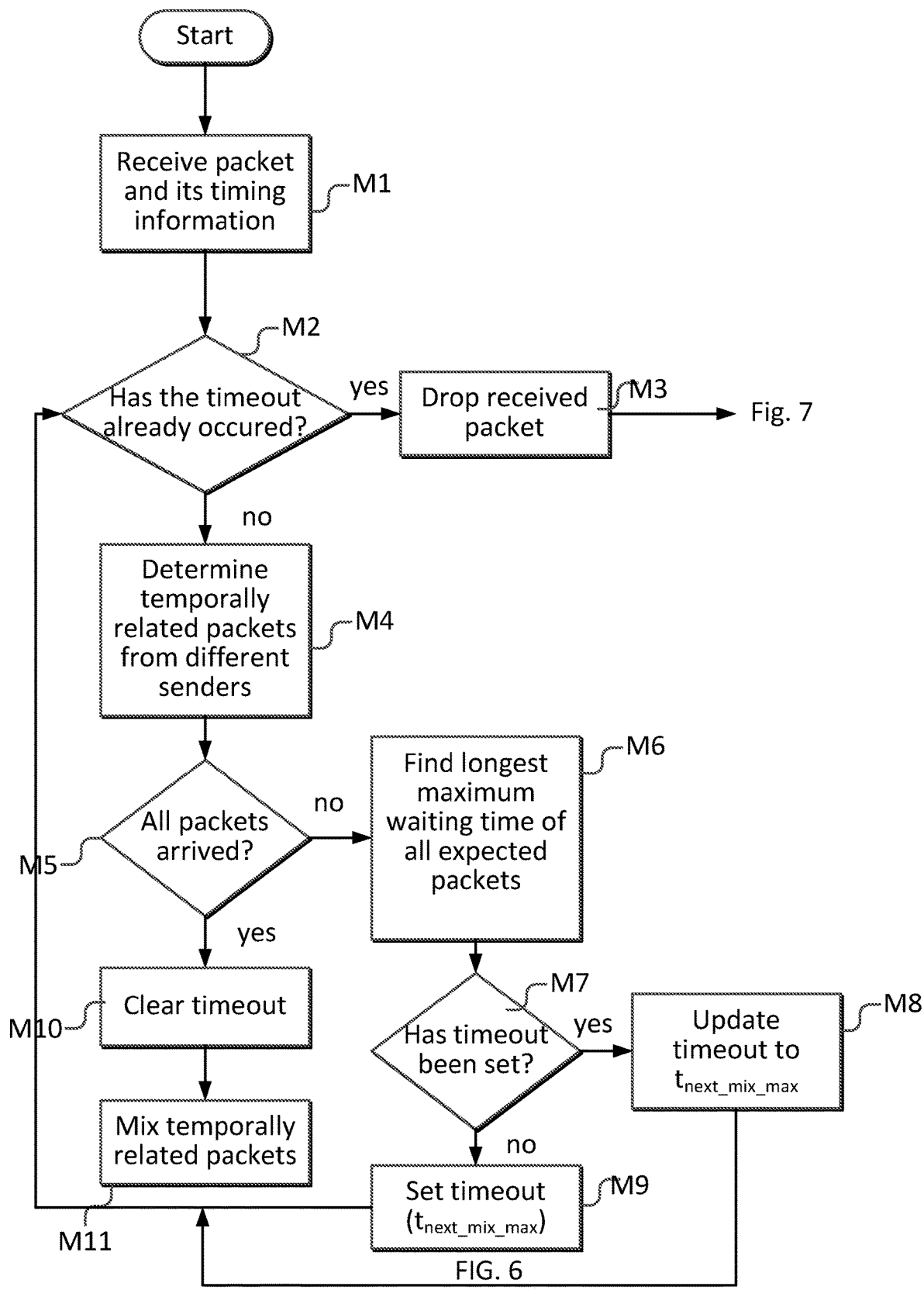
FIG. 6 is a flow diagram of an embodiment of the current disclosure.

According to another general embodiment, with reference to FIG. 6, the proposed technology discloses a method in a mixing unit 16 for mixing received data packets from a plurality of data streams. The method includes receiving M1 decoded data packets and their timing information, which timing information comprises at least a determined maximum waiting time for each decoded data packet. Further, the method includes optimizing M6 a waiting time for a subsequent mix of data packets based on the timing information, and finally mixing at least a subset of the decoded received data packets based on the determined optimized waiting time. Thereby, the aforementioned early mixing method can be improved to provide an adaptive waiting or mixing time.

In the following description, embodiments of the mixing method and the mixer 16 or mixing unit will be described first, after which embodiments of the method performed by the network node 10 such as a conference bridge utilizing such a mixing method and a network node including such a mixing unit 16 will be described.

In the mixer 16 or mixing unit 16 of the conference bridge 10, with reference to the flow diagram in FIG. 6, it is then time for the second step of the two-step method, which includes optimizing, in step M6, the waiting time or timeout before which the mixer 16 should create a new mix e.g. generate a new packet for the outgoing media stream. This is performed based on all or a selected subset of all media streams. Embodiments related to selection of subsets will be described further later on in this disclosure.

Initially, as described previously, in a first step M1, the mixing unit 16 receives a (decoded) data or media packet together with timing information for the packet, such as its arrival time and a previously determined maximum waiting time. Optionally also the send time for the packet is included. As discussed previously, the packet has been decoded upon arrival in the network node or conference bridge 10, whereby the mixer or mixing unit 16 receives the decoded packet together with its timing information such as arrival time and its determined maximum waiting time. In a next step, step M2, the mixer checks if a previously set timeout or maximum waiting time for the packet has already expired. In case the timer has expired, then the mixer drops, in step M3, the received packet since it has already been deemed lost.

Figure 7:
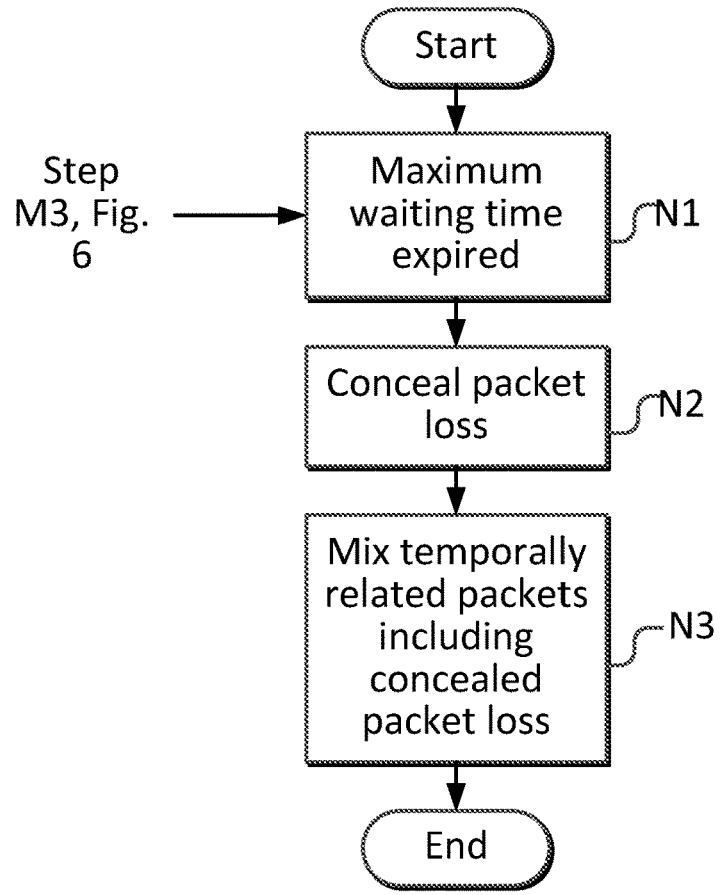
FIG. 7 is a flow diagram of a further embodiment of the current disclosure.

In case the set timer has already expired and a packet loss has been detected or determined in step M2 and a packet dropped in step M3, in an optional embodiment, with reference to FIG. 7, the method further comprises the steps of in case of an expired optimal waiting time N1 prior to receiving all determined temporally related data packets, concealing N2 packet loss and performing mixing N3 of temporally related packets including concealed packet loss.

Subsequently, in step M4, if the set timer has not expired the mixer 16 needs to determine if there are temporally related packets originating from different incoming media streams that should be mixed together.

According to a further embodiment, the optimizing step M6 includes optimizing the waiting time for a subsequent mix of packets based on a maximum waiting time for each of at least a subset of the received data packets. In the context of the mixing unit 16, a received data or media packet always refers to a received decoded data or media packet, since the network node 10 in which the mixer is located has already decoded the data or media packet prior to forwarding it to the mixing unit 16, which will be described further below.

The input to the mixer is a number of incoming media streams. The mixer has to determine, M4, which packets that are temporally related and should be mixed together. The mixer can then predict the latest acceptable arrival time for a packet based on arrival time and maximum waiting time for the latest received packet in the same stream and set a timeout during which it holds off mixing a new packet. The mixing time or timeout or optimal waiting time is set according to the Equation below $$t_{next_{max}} = t_a + w + \text{ptime}$$

where $t_{next_{max}}$ is the time when the next packet should be available, $t_a$ is the arrival time of the packet, w is the maximum waiting time until for instance 95% of the packets have arrived, and ptime is the duration of the media in the packet Instead of ptime the difference between expected RTP timestamp and RTP timestamp of the previous packet can be used. The mixer can then easily calculate at what time the next mix should be done with this formula (example with three streams):

$$t_{next_{mix}max} = \text{MAX}(t_{next_{max} 1}, t_{next_{max} 2}, t_{next_{max} 3})$$

This means that the mixer will wait until that time $T_{next_{mix}max}$, where we expect to have received packets from all incoming streams. The $t_{next_{mix}max}$, can be referred to as a mixing time or an optimal or maximum waiting time, a timeout or a joint maximum waiting time.

As described in the flow diagram in FIG. 6 $t_{next_{mix}max}$ is re-calculated for each received packet. Only streams for which the mixer is waiting for packets are included. In the example below three streams are part of the mix. The packet from stream 2 has already been received so $t_{next_{mix}max}$=MAX $(t_{next_{max} 1}, t_{next_{max} 3})$. An example of the timing of the various media streams is illustrated in FIG. 8.

In step M5, the mixer determines if all determined temporally related packets have arrived. If that is the case, the timeout is cleared or reset in step M10 and the received packets are mixed, in step M11 and the mixer generates an outgoing packet which is then encoded and transmitted to its intended target.

If not all expected packets are deemed to have been received in step M5, then the mixer identifies the longest waiting time of all expected packets in step M6. Then, the mixer determines if a timeout has been previously set in step M7. If no timeout has been set, it is set as $t_{next_{mix}max}$ in the next step M9. If a timeout has been previously set, then it is updated to $t_{next_{mix}max}$ in step M8.

Figure 8:
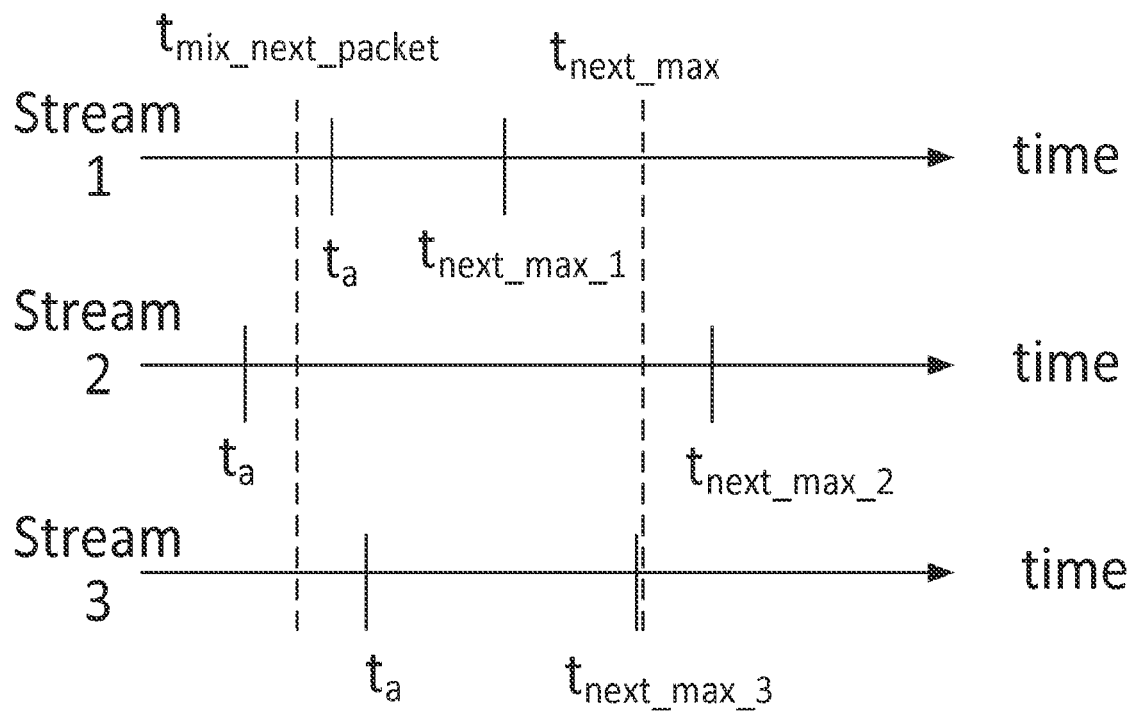
FIG. 8 is a timing chart for three media streams according to the present disclosure.

With reference to FIG. 7 and FIG. 8, a further embodiment of the method in the mixer will be described. In step N1 the set timeout expires and the mixer needs to determine if all expected packets have been received. If this is not the case then, in step N2, the mixer employs any known error packet loss concealment method in order to compensate for or concealed the lost packet. Finally, in step N3, the mixer generates an outgoing packet based on the received packets and the provided packet loss concealement.

If all packets have arrived before $t_{next_{mix}max}$ the mixer generates an output immediately. $t_{next_{mix}max}$ is depending on all individual streams, and if $t_{next_{max}}$ for a certain stream is less than the mixer's $t_{next_{mix}max}$, the extra waiting time will reduce the late loss rate for that stream.

As mentioned previously, it is possible to optimise the waiting time or timeout such that certain media streams are prioritized or selected.

As mentioned before, the mixer needs to identify which packets are temporally related and therefore should be mixed together. Typically this so-called synchronization is based on the incoming time stamps of packets. But some extra information is needed in order to map the incoming time stamps to the internal clock of the mixing unit. When using RTP, this information is received from the RTCP reports. These reports contain information of how the timestamps of each stream should be mapped to a common clock. This common clock may be a global clock, i.e. from an NTP server, but is usually a local clock in that client. If it is a local clock, it means that streams coming from the same client can be synchronized but not streams from different clients.

In a typical conference scenario there is little or no benefit in synchronizing streams from different clients, it would only add delay. But there are some special scenarios where synchronizing to a global clock might be desirable, such as when media from two clients are describing the same thing, such as several microphones that capture the same audio source from different directions.

Exactly how the mapping is done from incoming timestamps to the internal clock of the mixer is outside the scope of this invention. The timestamps of the packets that are received by the mixing unit are already mapped to the internal clock.

The present technology makes it possible to prioritize certain media streams. The quality target can for instance be increased for an active speaker. The maximum waiting time would then be longer for the active speaker, while the number of late losses would be reduced.

In the beginning it was explained that each participant that is part of the mixed stream will contribute with jitter that propagates into the mixed stream. By lowering the quality target for participants that are not the active speaker, the jitter that propagates from these users is decreased.

Figure 9:
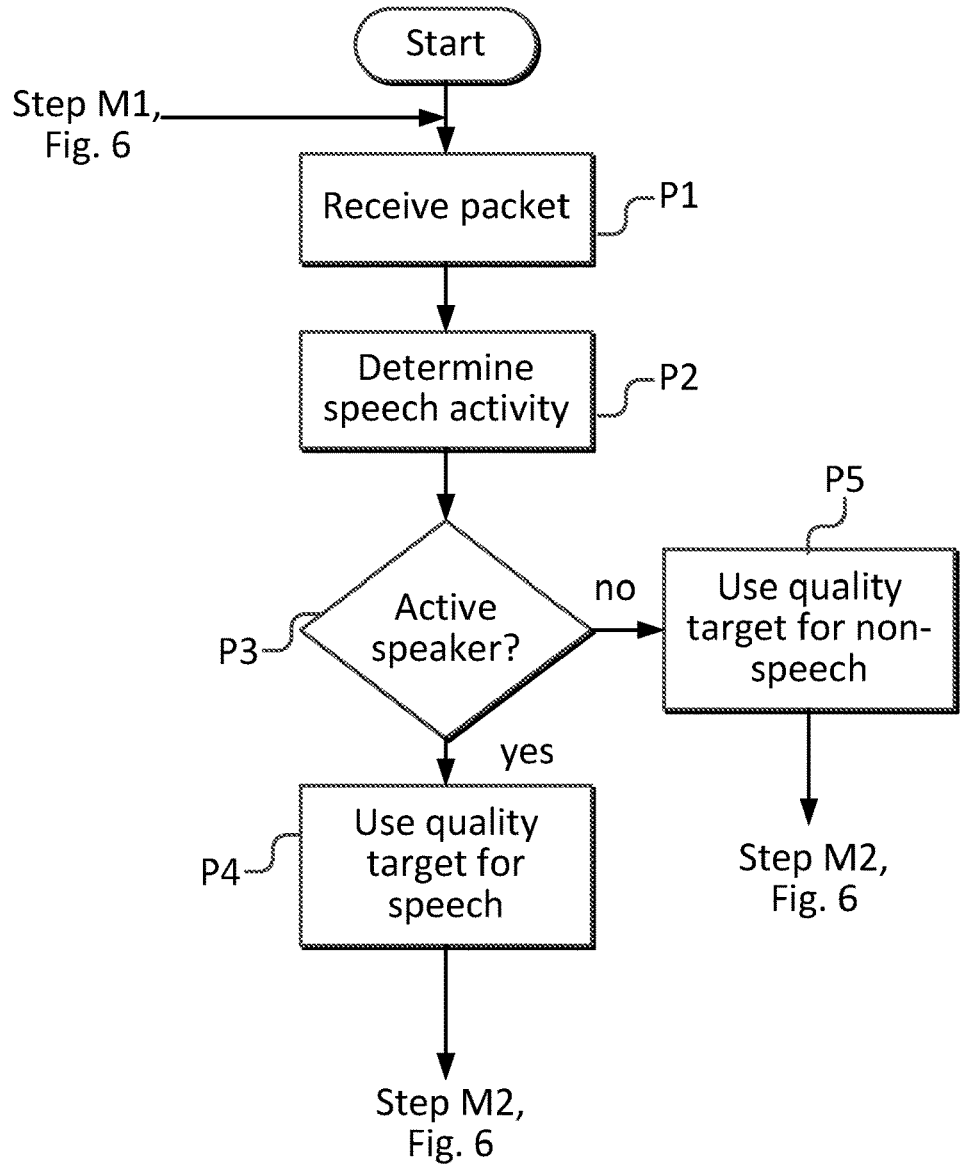
FIG. 9 is a flow chart of an embodiment of the current disclosure.

In a basic embodiment, with reference to FIG. 9, a packet is received in step P1. The speech activity for the received packet is determined, in step P2, based on current and previous packets from the same stream. Subsequently, it is determined, in step P3, whether someone is speaking or in other words if there is an active and/or prioritized speaker in that stream. If it is determined that there is an active and/or prioritized speaker in that stream, then a speech specific (higher) quality target is selected for that packet in step P4. If, on the other hand, no active and/or prioritized speaker is detected in the packet then another speech specific (lower) quality target is selected in step P5 for the specific packet or stream. In this embodiment the waiting time for temporally related data packets is optimized based on the quality targets of each data packets.

In the above, the use of a lower quality target indicates that a higher degree of packet loss is allowed thus enabling having a shorter maximum waiting time for a certain data stream. On the other hand, a higher quality target indicates that a lower degree of packet loss is allowable, thereby necessitating a longer maximum waiting time in order to ensure a lower packet loss.

A speech detector can also be used to control the quality target continuously. When speech is detected the quality target for that stream is increased. This way the outgoing jitter will mainly be influenced by streams that contain actual speech.

Additionally, the method comprises the step of prioritizing data streams based on the above mentioned speech detection.

When the quality target is set low for a stream, it will mean that packets are going to be late and error concealment is used to fill these gaps. It is believed that this will have little effect on the speech activity detection. However, in an alternative embodiment the speech detection for each stream can be run with longer waiting times than the mixing. This would mean a higher quality of the stream that the speech detection is processing but also that there will be an extra delay of the speech activity detection decision.

There might be other reasons to prioritize stream over others, i.e. in a seminar situation where a main speaker could be given priority so as to guarantee a high media quality from this participant. Even if there are a large number of other participants with bad network connections, they should not affect the delay so much since their priority is low.

Another case could be a group communication service where some streams represent a movie stream or other content where the quality should never be compromised. In this case those streams could be prioritized so the expected quality is achieved, and if necessary the delay through the mixer is increased.

Figure 10:
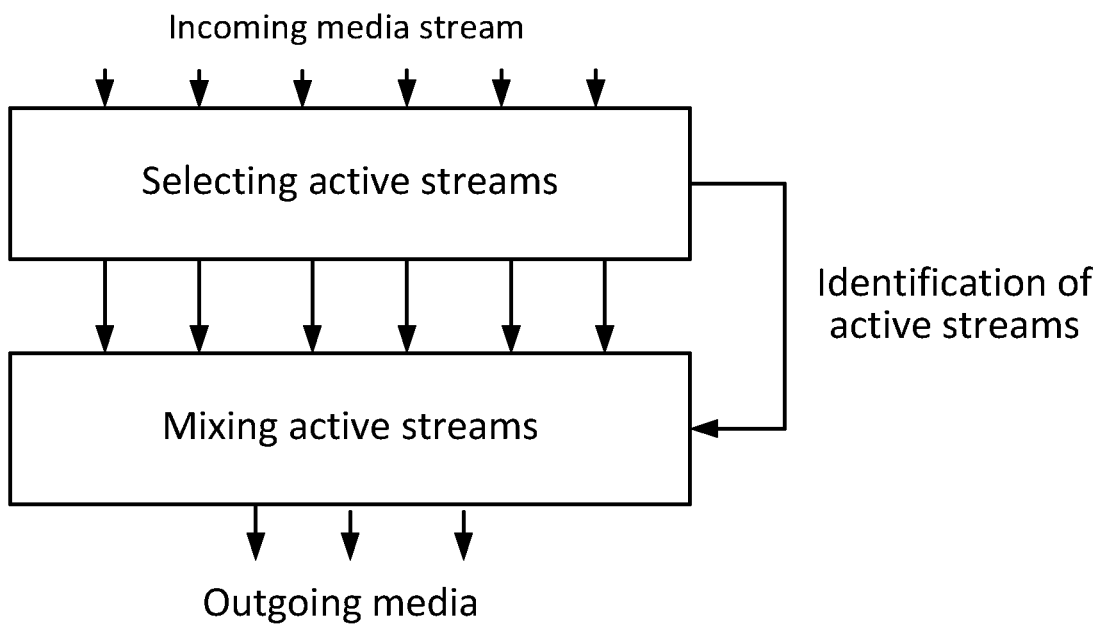
FIG. 10 is a block chart of an embodiment of the current disclosure.

According to a further embodiment, the mixing time or optimal waiting time for the mixer could be based on a subset or selection of all available incoming media streams. This will be described further below with reference to FIG. 10.

The number of received streams is usually larger than the number of active streams. By including only active streams when the latest acceptable mixing time or optimal waiting time or timeout is calculated, the latency can be reduced. Finding the active streams is then a process that is separated from the mixing. This process can run with a longer waiting time making the streams more complete before selecting the active streams.

One potential difficulty in a system with several nodes and clients basing their synchronization on different clocks is that there will always be some clock-skew between the streams to be mixed. If clock-skew is not compensated for, data would be buffering up for some streams while other streams would always be out of data. The clock-skew can be estimated using known techniques, such as described in e.g. [Tõnu Trump, ICASSP 2000]. The estimated clock-skew can then be compensated for by resampling the incoming streams so as to match a reference clock. This resampling would however need some extra buffering, which would case delay. An alternative solution is to compensate the clock-skew by either discarding frames or producing extra frames using error concealment methods.

Since the differences in clock rate is usually very small, typically in the range of 0-0.003%, this compensation would mean that a packet is either discarded or created every 1.5 min if a 20 ms frame length is used. This must be accounted for, as an extra packet loss rate, in the calculation of the optimized waiting time.

By keeping statistics over current clock-skew and needed compensation, the loss of a packet might be used to our advantage by not recreating the packet with error concealment.

Figure 11:
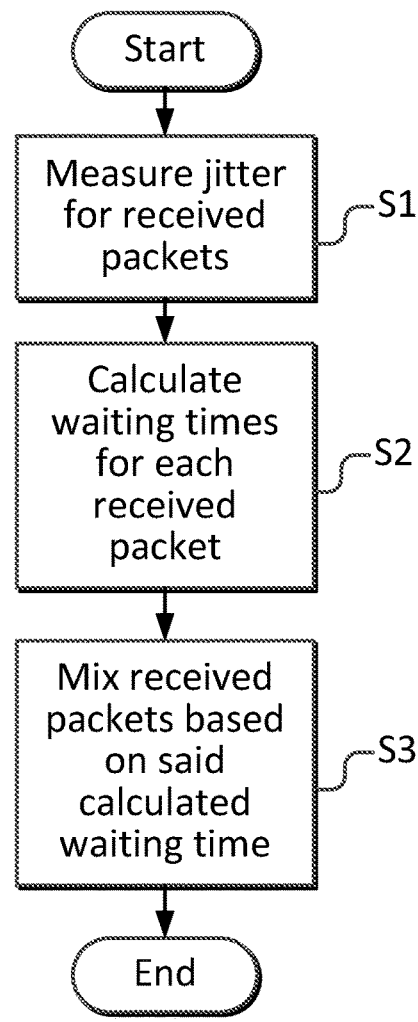
FIG. 11 is a flow chart of an embodiment of the current disclosure.

With reference to FIG. 11, further specific embodiments of the method performed by the network node such as a conference bridge 10 will be described below. Accordingly, the conference bridge 10 is configured to measure, in step S1, at least jitter for every received media packet of each of said plurality of incoming data streams. In this embodiment this is performed by the indicated jitter or timing info unit 25, optionally both jitter e.g. delay as well as other timing information is extracted or measured from the received packets. Subsequently, a maximum waiting time is calculated, in step S2, for each received data packet of each of the plurality of incoming data streams based on the measured jitter. Finally, the received data packets and their measured or determined jitter e.g. delay and optional timing information is forwarded to a mixing unit 16 (configured as described previously) which mixes, in step S3, at least a subset of the received data packets based at least on at least one of the respective calculated maximum waiting time. The received packets are, as described earlier in relation to prior art, also decoded before being forwarded to the mixing unit 16 and the mixed packets are subsequently encoded prior to being forwarded to a target user.

With reference to FIG. 11, an embodiment of a method according to the disclosed technology will be described. In short, in step S1, jitter is measured and provided for every received packet of each incoming media stream. A maximum waiting time is then calculate, in step S2, for each received packet. Finally, in step S3, received packets are mixed based on the respective calculated waiting times. In general, a mixing time e.g. an optimal or maximum waiting time is calculated for each outgoing packet, as an example the mixing time e.g. optimal or maximum waiting time is set as the longest waiting time for a selected group of temporally related packets.

Figure 12:
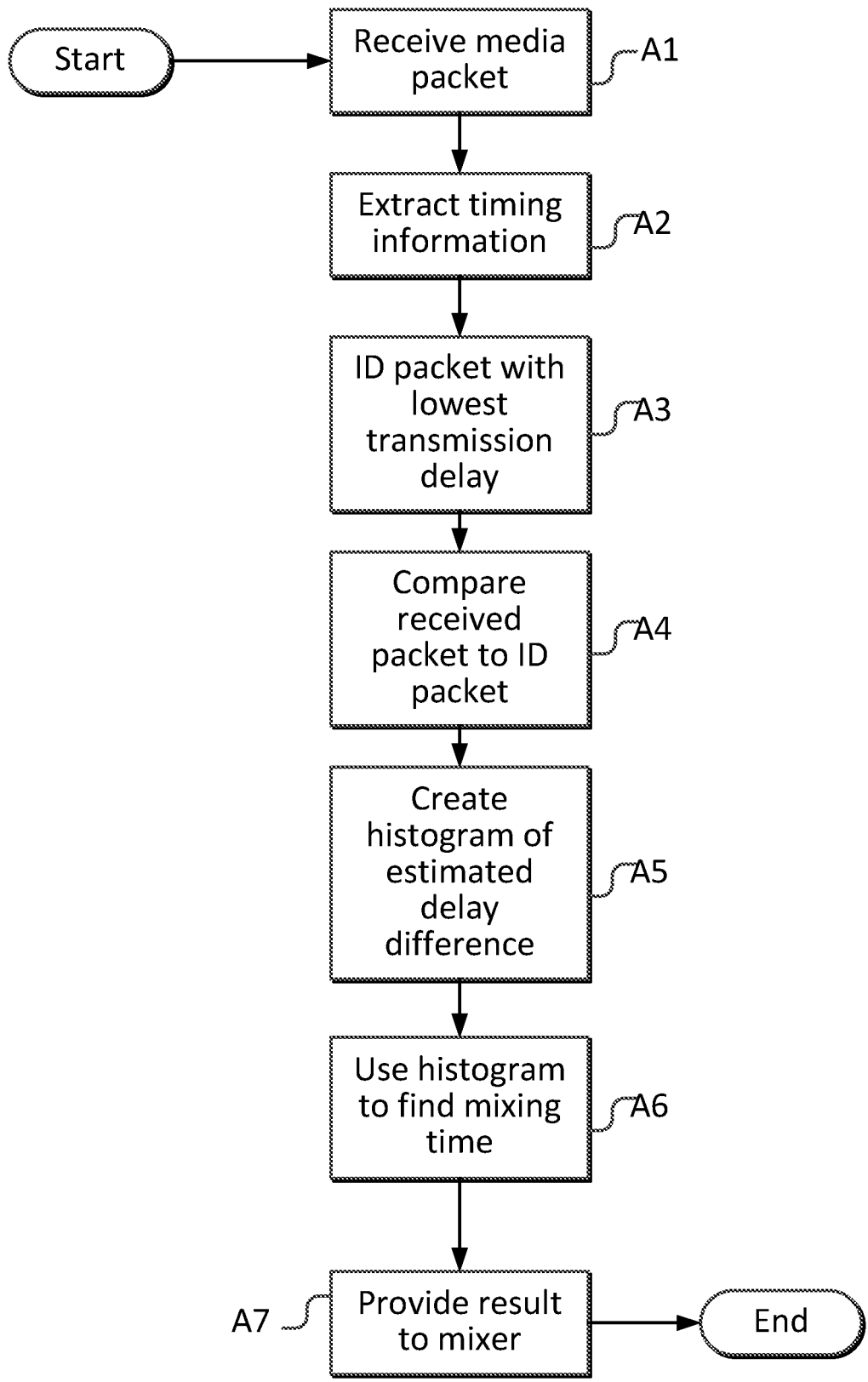
FIG. 12 is a flow chart of a further embodiment of the current disclosure.
Figure 14:
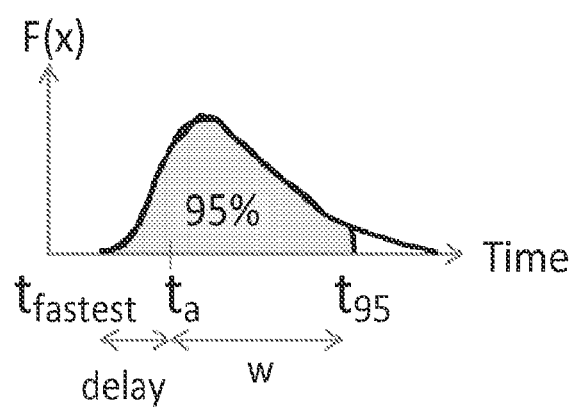
FIG. 14 illustrates an estimated probability density function.

With reference to FIG. 12, an embodiment of the calculation of the respective maximum waiting time for each received packet will be described. The description concerns one packet on one media stream, but the method is performed for each packet of each incoming media stream. Initially, in step A1, a media packet is received in one media stream e.g. one of User A-E in the previous examples. In a next step A2, timing information, such as the arrival time (wall-clock time) and an RTP time stamp for the packet is extracted. Other timing information can comprise send time for the packet, which can be sent as a RTP header extension. Subsequently, in step A3, the packet with the lowest transmission delay e.g. the fastest packet, within a predetermined number of received packets is identified. In this example typically the fastest packets of 40 received packets is identified, however depending on the situation or network another number of packets can form the basis for this identification. Then, in step A4, the presently received packet is compared to the identified fastest packet. Based on the comparison, in step A5, a histogram or corresponding representation, of the estimated delay difference is formed (see FIG. 14). Using the histogram, in step A6, the maximum waiting time for the currently received packet is determined. Finally, in step A7, the determined maximum waiting time for the present received packet is forwarded or provided to the mixer.

FIG. 12 illustrates an embodiment of the seven steps needed to calculate the maximum waiting time for a packet. For each received packet timing information such as its arrival time (wall-clock time) and RTP time stamp is used, optionally also the send time for the packet. The fastest packet, i.e. the packet with the lowest transmission delay, is identified among the 40 previously received packets and used as a reference point. How this, e.g. identification of the fastest packet, can be done is described in patent WO2009070093 and for reference reproduced below.

Figure 13:
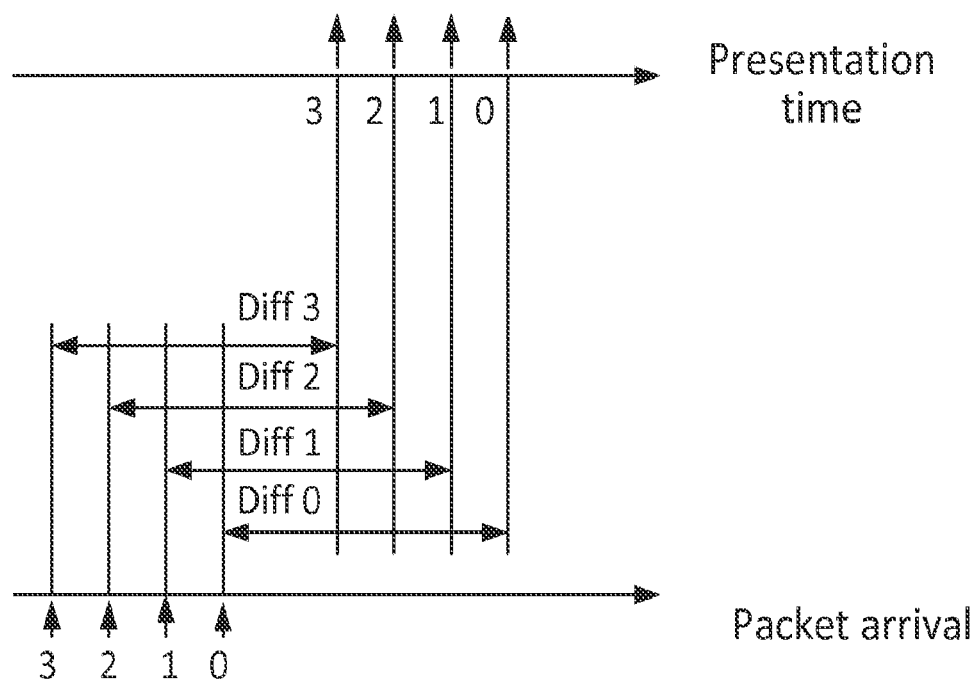
FIG. 13 illustrates a packet presentation time and arrival time.

FIG. 13 illustrates the time stamps of the presentation time and the packet arrival time for the four packets numbered from 0 to 3, as well as the difference. Packet 0 is the last received packet, and the arrival time, arrival_time[i], is defined according to the following algorithm:

$$\text{arrival\_time}[i] = \text{arrival\_time\_sec}[i] \times \text{sampling\_freq},$$
i.e. RTP time scale It must be ensured that time_stamp[i]>arrival_time[i] for j=0 to 40 by adding/subtracting a constant value from either the time stamp or the arrival time. The difference, diff[i], may be calculated by the following algorithm:

$$\text{diff}[i] = \text{time\_stamp}[i] - \text{arrival\_time}[i]$$

Thus, the index for the packet with the lowest transmission delay, i.e. the fastest packet, can be located from the stored data, and the max_index is the index that maximizes max diff[i] for i=0 to 40. In FIG. 13 the max_index would correspond to 3, which represents the fastest packet.

$$\text{delay} = (\text{arrival\_time}[0] - \text{arrival\_time}[\text{max\_index}]) - (\text{time\_stamp}[0] - \text{time\_stamp}[\text{max\_index}])$$

According to the above mentioned prior art WO2009070093 the delay is converted to buffer size, which is not the case for the disclosed technology here.

As mentioned previously, and with reference to FIG. 14, the disclosed technology uses a histogram of calculated delays e.g. estimated probability density function (PDF) to find the mixing time or optimal waiting time. The delay calculated in the formula above will in this figure be $t_a - t_{fastest}$, where $t_a$ is the arrival time of a current packet, $t_{fastest}$ is the arrival time of the determined fastest packet. By identifying the time corresponding to a certain percentage of the total area, in this example 95%, the maximum waiting time (w) for each packet can be calculated as $w = t_{95} - t_a$. Each received packet is then delivered to the mixer together with both arrival time $t_a$ and calculated maximum waiting time.

Figure 15:
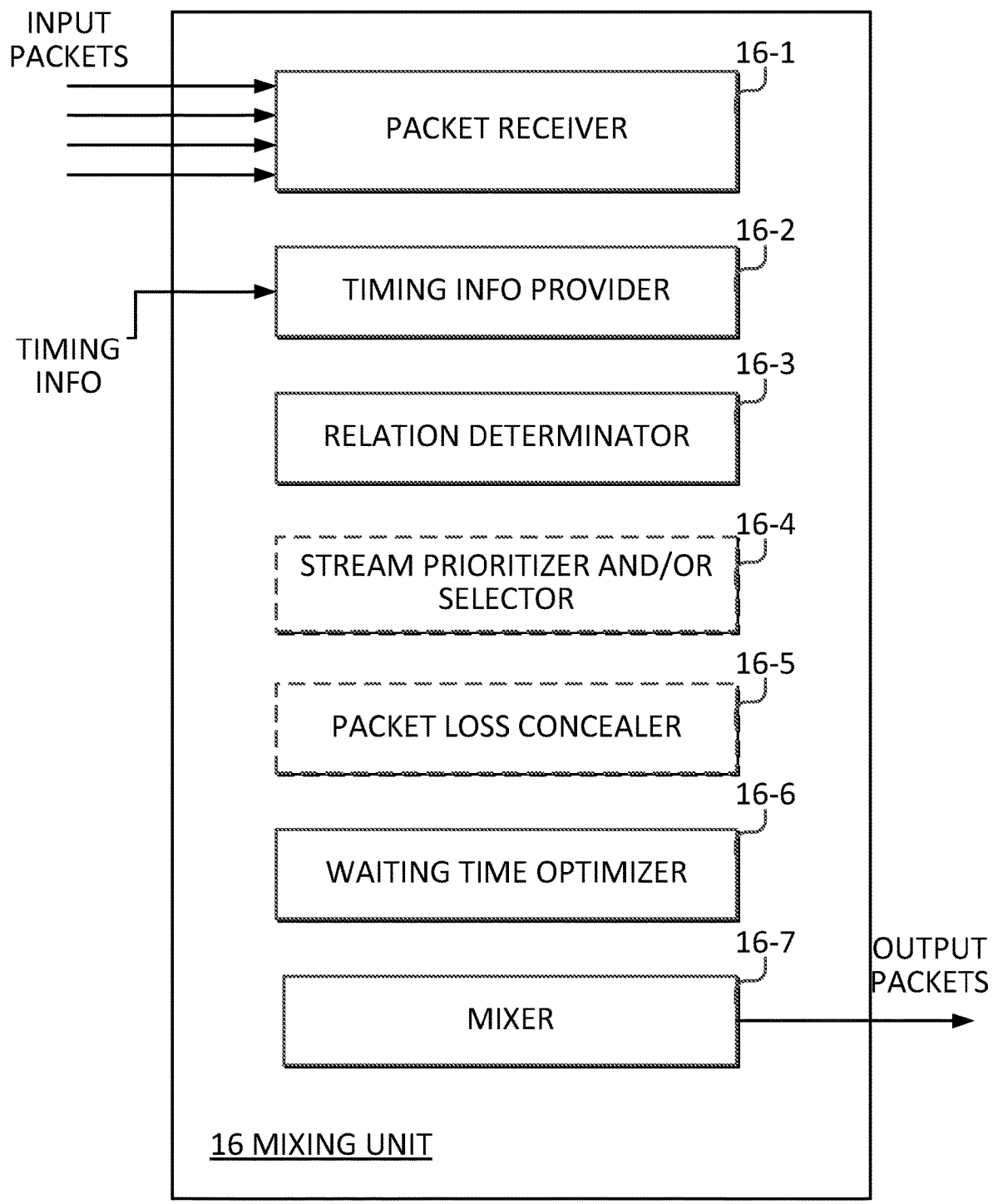
FIG. 15 is a block chart of a further embodiment of the current disclosure.

With reference to FIG. 15 an embodiment of a mixing unit 16 according to the disclosed technology will be described. The mixing unit 16 is configured to be implemented in the embodiment of the conference bridge 10 as indicated in FIG. 16.

Accordingly, the mixing unit 16 is configured to mix received data packets, wherein the mixing unit 16 is configured to receive M1 decoded data packets and their timing information, which timing information comprising at least a determined maximum waiting time for each decoded data packet. Further, the mixer or mixing unit 16 is configured to optimize a waiting time for a subsequent mix of data packets based on the timing information; and to mix at least a subset of the decoded received data packets based on the optimized waiting time.

Consequently, the mixing unit 16 includes, according to a further embodiment, a packet receiving unit 16-1 configured to receive decoded packets from a plurality of media streams. Further, the mixing unit 16 includes a jitter information retrieving unit 16-2 configured to receive jitter information for each received packet. The jitter information can comprise timing information enabling the determination of a maximum waiting time for each packet, or timing information including an already calculated maximum waiting time for each received packet. Further, the mixing unit 16 includes a relation determiner 16-3 configured to determine a temporal relation between incoming packets in order to determine if packets are temporally related. In addition the mixing unit 16 includes an optimizing unit 16-6 configured to determine a mixing time or an optimal or joint waiting time for temporally related packets. Finally, the mixing unit 16 includes a mixer 16-7 configured to mix selected temporally related received packets based on the mixing time or optimal waiting time before providing the packets to an encoder 18 for forwarding to an end user. Optionally, the mixing unit 16 further includes a stream prioritizing and/or selector unit 16-4 configured to prioritize media streams or select media streams to affect the determined mixing time or optimal or joint waiting time. Also, the mixing unit 16 might include a packet loss concealment unit 16-5 configured to implement packet loss concealment in case of not all expected temporally related packets arriving within the set timeout.

Figure 16:
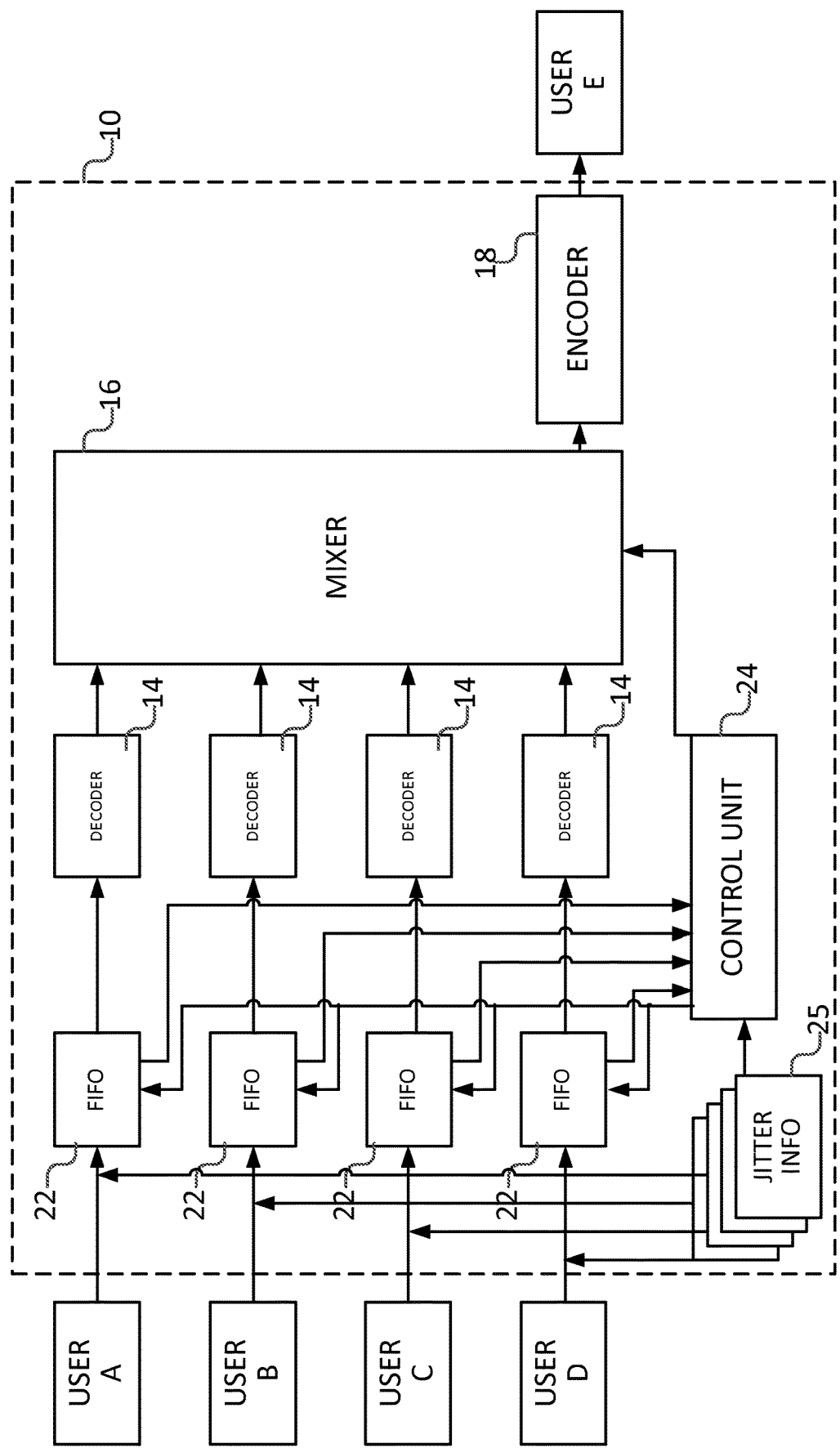
FIG. 16 is a block chart of an embodiment of the current disclosure.

With reference to FIG. 16 an embodiment of a conference bridge 10 according to the current disclosure will be described. The conference bridge 10 is configured to perform the method according to the previous description. In a general embodiment, the network node 10 comprises a mixing unit 16 according to any the above described embodiments, wherein the network node 10 is further configured for measuring at least jitter for every received data packet of each of said plurality of incoming data streams, calculate a maximum waiting time for each said received data packet of each of said plurality of incoming data streams based on said measured jitter, and control mixing of at least a subset of said received data packets based at least on said calculated maximum waiting time.

Accordingly the conference bridge 10 includes a plurality of queues 22 e.g. first-in-first-out queues (FIFO) configured to receive packets of a respective media stream, in the FIG. 16 exemplified as User A-D. Further the conference bridge 10 includes a respective jitter monitoring unit 25, each of which is configured to monitor and extract and provide at least jitter information from each incoming packet on each respective media stream. The jitter monitoring units 25 are configured to either receive timing information for each packet or to measure and calculate timing information for each received packet. Packets received are decoded in a respective decoder 14 and forwarded to the mixing unit 16. In addition, the conference bridge 10 includes a control unit 24 configured to control the forwarding of packets from each respective queue 22 and the jitter information related to each received packet to the mixing unit 16. Further, the conference bridge 10 includes an encoder 18 configured to encode outgoing packet from the mixing unit 16 before forwarding the encoded mixed packet to a recipient user e.g. User E in the example. The mixing unit 16 is configured to perform the mixing of received packets based on a determined maximum waiting time for each received incoming packet to provide an outgoing media stream of mixed media packets.

The embodiments of the mixer 16 and conference bridge 10 according to the current disclosure may also include radio circuitry for communication with one or more other nodes, including transmitting and/or receiving information.

It will be appreciated that the methods and devices described above can be combined and re-arranged in a variety of ways.

For example, embodiments may be implemented in hardware, or in software for execution by suitable processing circuitry, or a combination thereof.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

Figure 17:
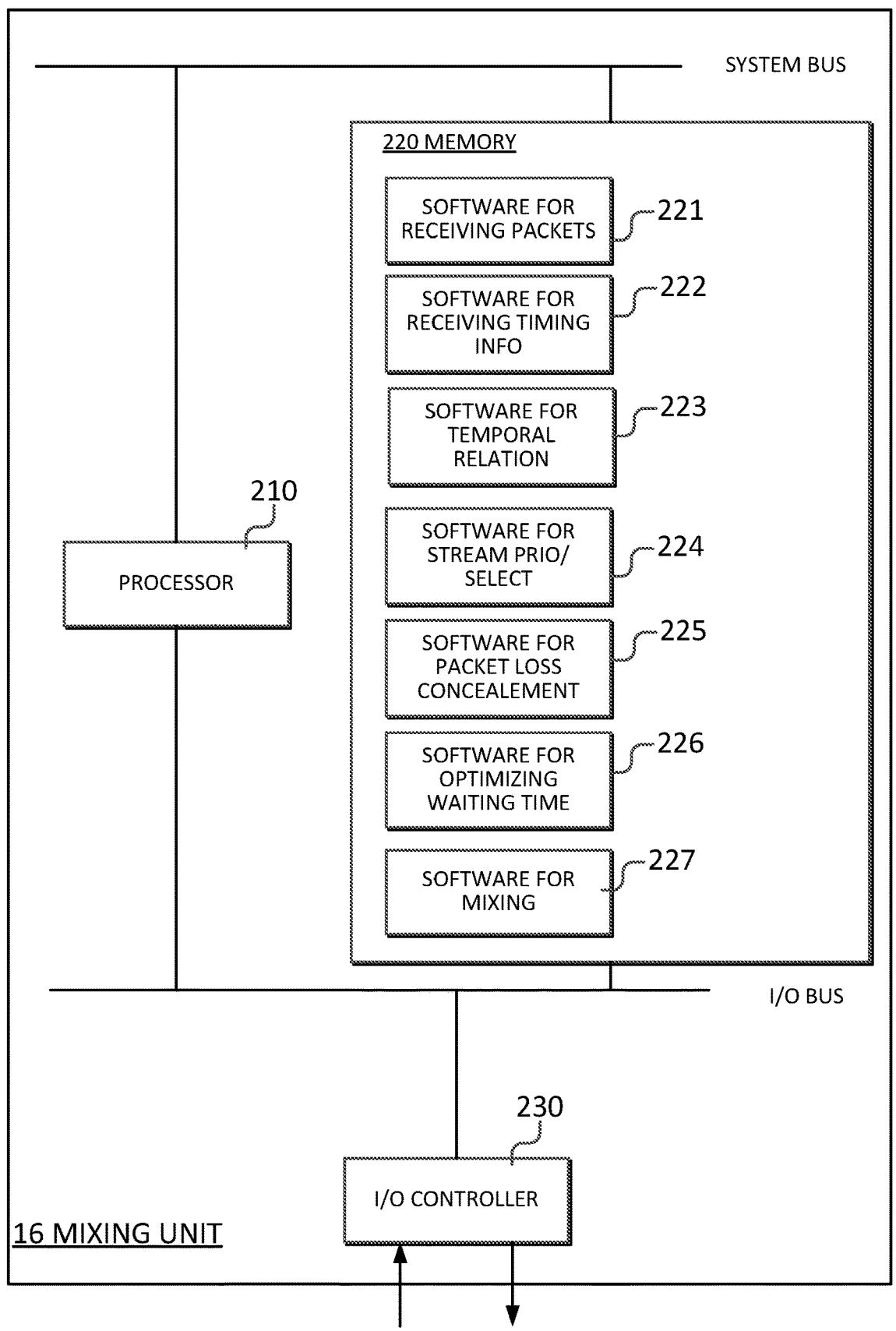
FIG. 17 is an illustration of an embodiment of the current disclosure.

In the following, an example of a computer implementation of a mixing unit 16 will be described with reference to FIG. 17. The mixing unit 16 comprises processing circuitry such as one or more processors 210 and a memory 220. In this particular example, at least some of the steps, functions, procedures, modules and/or blocks described above are implemented in a computer program, which is loaded into the memory for execution by the processing circuitry 210. The processing circuitry 210 and memory 220 are interconnected to each other to enable normal software execution. An optional input/output device 230 may also be interconnected to the processing circuitry 210 and/or the memory 220 to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

In a particular embodiment, the computer program comprises program code which when executed by the processing circuitry or computer causes the processing circuitry or computer to perform the methods according to the previously described embodiments.

The program code may be organized as appropriate functional modules configured to perform, when executed by the processing circuit, at least part of the steps and/or tasks described above.

The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

For example, the computer program stored in memory includes program instructions executable by the processing circuitry, whereby the processing circuitry is able or operative to execute the above-described steps, functions, procedure and/or blocks.

The conference bridge 10 and mixing unit 16 are thus configured to perform, when executing the computer program, well-defined processing tasks such as those described above.

The computer or processing circuitry does not have to be dedicated to only execute the above-described steps, functions, procedure and/or blocks, but may also execute other tasks.

In a particular example, the network node 10 and the mixing unit 16 each comprises a processor 310, 210 and a memory 320, 220, said memory comprising instructions executable by the processor, whereby the apparatus/processor is operative to perform the previously described steps.

Figure 18:
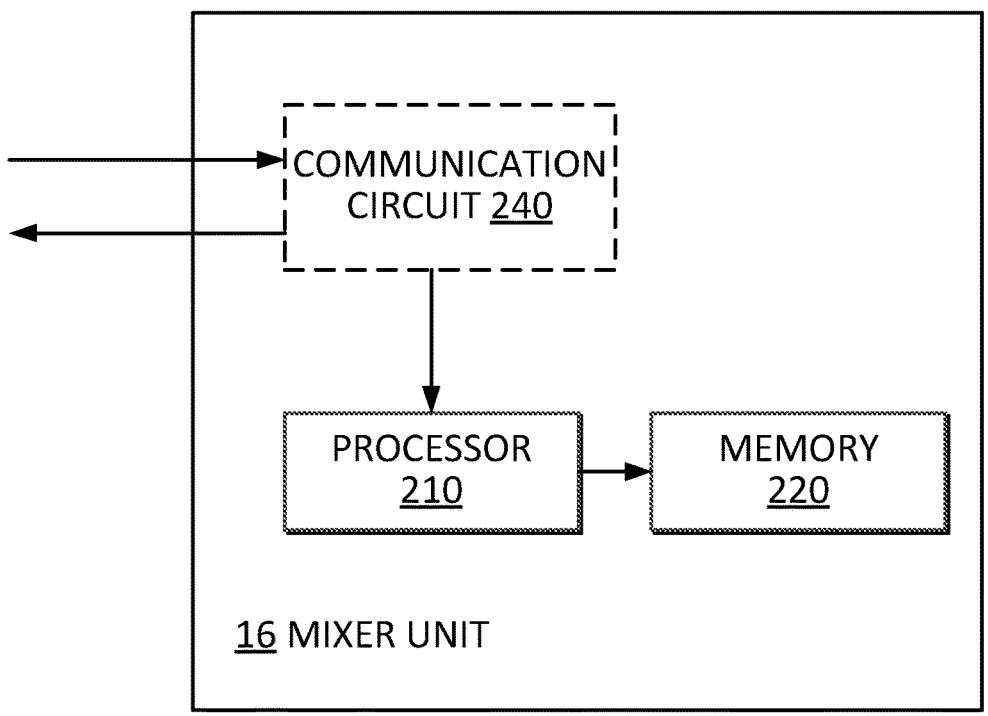
FIG. 18-21 are further illustrations of embodiments of the current disclosure.

FIG. 18 is schematic block diagram illustrating an example of a mixing unit 16 comprising a processor 210 and an associated memory 220, and a communication circuitry 240. The mixing unit 16 comprises a processor 210 and a memory 220, which memory 220 comprising instructions executable by the processor 210, whereby the processor 210 is operative to receive decoded data packets and their timing information, which timing information comprising at least a determined maximum waiting time for each decoded data packet. In addition, the processor is operative to optimize a waiting time for a subsequent mix of received data packets based on said timing information, and to mix at least a subset of the decoded received data packets based on the optimized waiting time.

In addition, the mixing unit 16 may comprise communication circuitry 240 configured to receive decoded data packets and their timing information, which timing information comprising at least a determined maximum waiting time for each decoded data packet. Additionally, the communication circuitry can be configured to output mixed data packets to be decoded before being transmitted to a user.

Figure 20:
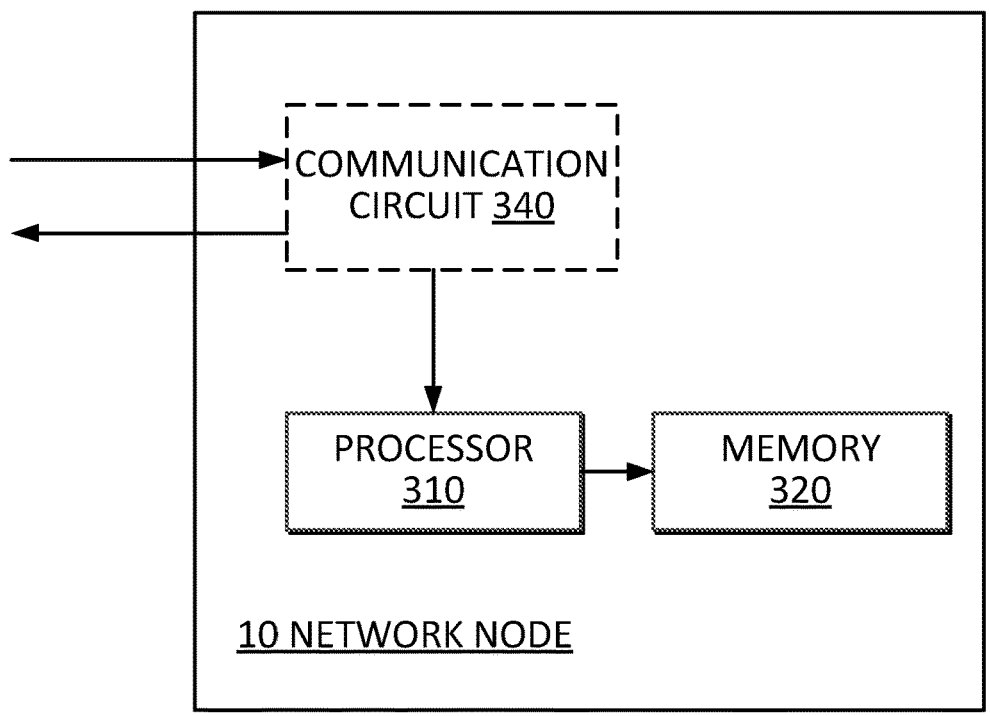

FIG. 20 is a schematic block diagram illustrating an example of a network node 10 comprising a processor 310 and an associated memory 320 and a communication circuitry 340. With reference to FIG. 20, the network node 10 comprises a processor 310 and a memory 320, which memory 320 comprising instructions executable by the processor 310, whereby the processor 310 is operative to measurer at least jitter for every received data packet of each of the plurality of incoming data streams, and calculate a maximum waiting time for each said received data packet of each of said plurality of incoming data streams based on said measured jitter. Further, the processor 310 is operative to control mixing of at least a subset of said received data packets based at least on said calculated maximum waiting time. Additionally, the network node 10 may include communication circuitry (340) configured to receive and decode data packets on a plurality of data streams and to transmit at least an encoded mixed subset of said received data packets.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, with reference to a mixing unit 16, the computer program comprises instructions, which when executed by at least one processor, cause the processor(s) to receive decoded media packets and their timing information, said timing information comprising at least a determined maximum waiting time for each decoded data packet, and to optimize a waiting time for a subsequent mix of data packets based on said timing information, and to mix at least a subset of said decoded received data packets based on said optimized waiting time.

In another particular embodiment, with reference to a network node 10, the computer program comprises instructions, which when executed by at least one processor, cause the processor(s) to measure at least jitter for every received data packet of each of said plurality of incoming media streams, and to calculate a maximum waiting time for each said received data packet of each of said plurality of incoming data streams based on said measured jitter, and to control mixing of at least a subset of said received data packets based at least on said calculated maximum waiting time.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding mixing unit 16 and network node 10 may be defined as a group of function modules, where each step performed by the processor corresponds to a function module. In this case, the function modules are implemented as a computer program running on the processor. Hence, the network node 10 and mixing unit 16 may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. Examples of such function modules are illustrated in FIG. 19 and FIG. 21.

Figure 19:
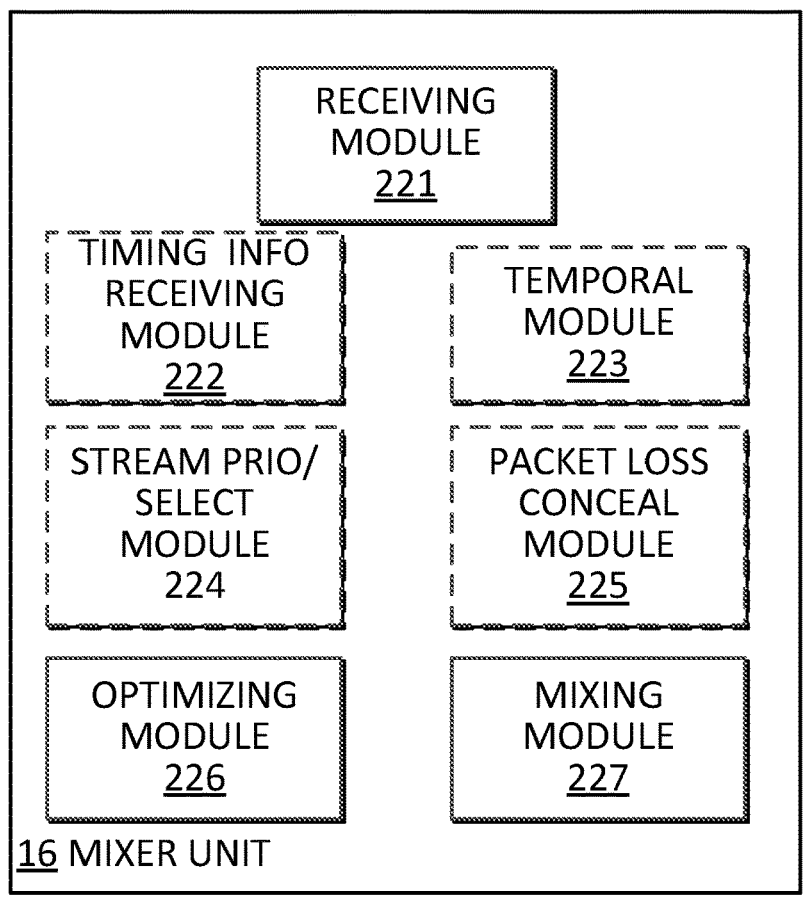

FIG. 19 is a schematic block diagram illustrating an example of a mixing unit 16 comprising a group of function modules. The mixing unit 16 comprises a receiving module 221 for receiving decoded data packets and their timing information 222, said timing information comprising at least a determined maximum waiting time for each decoded data packet. Further the mixing unit 16 includes an optimizing module 226 for optimizing a waiting time for a subsequent mix of data packets based on said timing information, and a mixing module 227 for mixing at least a subset of said decoded received data packets based on said optimized waiting time.

Figure 21:
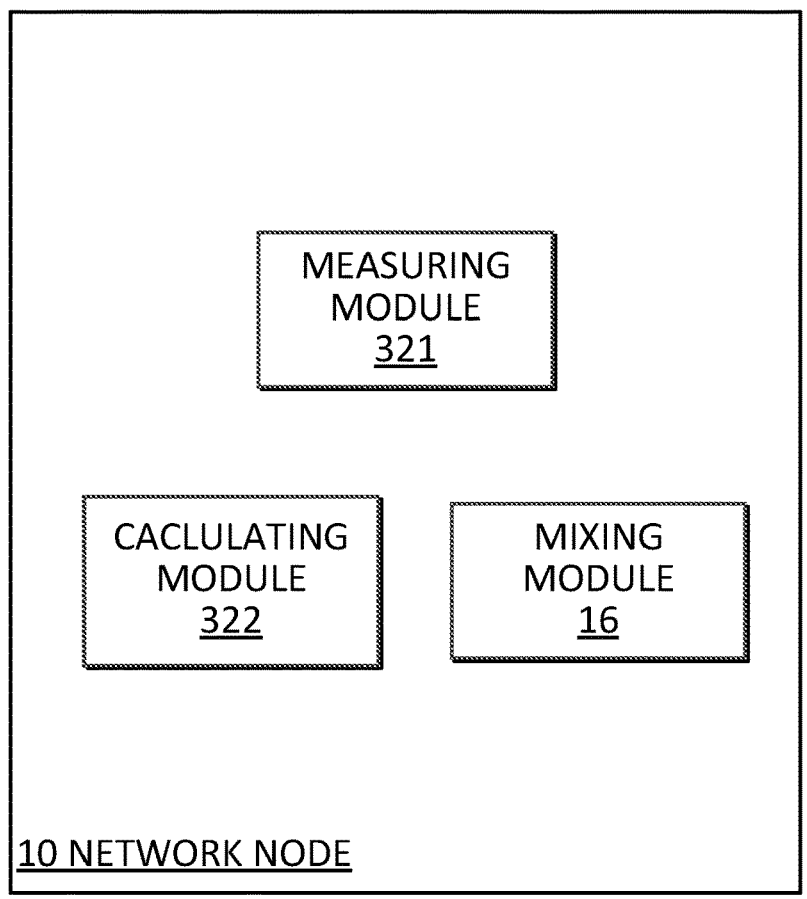

FIG. 21 is a schematic block diagram illustrating an example of a network node 10 comprising a group of function modules. The network node (10) comprises a measuring module 321 for measuring (S1) at least jitter for every received media packet of each of said plurality of incoming data streams. Further, the network node 10 includes a calculating module 322 for calculating (S2) a maximum waiting time for each said received data packet of each of said plurality of incoming data streams based on said measured jitter, and a control module 16 for controlling mixing (S3), of at least a subset of said received data packets based at least on said calculated maximum waiting time.

In the above described embodiments the functionality of the mixer or mixing unit 16 and the network node or conference bridge 10 have been described as separate but cooperating units, wherein the mixer 16 has been described as part of the network node 10. It is quite possible to implement the mixer as a separate entity which is provided with decode data packets as input and which outputs mixed data packets for encoding. It is also possible to adapt the network node 10 and the mixer or mixing unit 16 such that part of the functionality that is now described as implemented in the network node 10 is instead implemented in the mixer or mixing unit 16 or vice versa.

Some advantages provided by the present disclosure are listed below:
The present technology provides an optimized waiting time for an early mixing solution, which is continuously updated to keep a balanced trade-off between latency and quality.
Each received stream is decoded with a certain minimum quality target. The quality target is set individually for each stream.
The most active speaker can be prioritized by using a higher quality target. Propagation of jitter from other media streams can then be reduced while the quality of the active stream is prioritized.
A speech detector can be used to lower the quality target for parts of a stream where no speech is detected. Propagation of jitter can then be reduced.
Only active streams included in the mix are considered when the waiting time is calculated in the mixer.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method in a mixing unit for mixing received data packets from a set of N data streams, N being greater than 1, the method comprising:
receiving a first set of temporally related data packets, wherein receiving the first set of temporally related data packets comprises: receiving a first data packet belonging to a first one of the N data streams and receiving a second data packet belonging to a second one of the N data streams, wherein the second data packet is temporally related to the first data packet;
after receiving the first data packet, determining, based on timing information associated with the first data packet, a first maximum waiting time;
after receiving the second data packet, determining, based on timing information associated with the second data packet, a second maximum waiting time;
determining an optimized waiting time for a second set of temporally related data packets based on said determined first and second maximum waiting times, wherein determining the optimized waiting time based on said determined first and second maximum waiting times comprises determining whether the first maximum waiting time is greater than the second maximum waiting time and then setting the optimized waiting time for the second set of temporally related data packets to the greater of the first maximum waiting time and the second maximum waiting time; and
mixing at least a subset of said second set of temporally related data packets based on said determined optimized waiting time.

2. The method of claim 1, further comprising:
receiving a third data packet, the third data packet belonging to said first one of the N data streams, wherein
said step of determining the optimized waiting time further comprises updating the optimized waiting time as a result of receiving the third data packet, and
the step of updating the optimized waiting time comprises
i) setting the optimized waiting time to the second maximum waiting time or ii) setting the optimized waiting time to the greater of the second maximum waiting time and a third determined maximum waiting time.

3. The method of claim 2, wherein the step of updating the optimized waiting time comprises setting the optimized waiting time to the greater of the second maximum waiting time and a third determined maximum waiting time.

4. The method of claim 1, wherein, in case of an expired optimal waiting time prior to receiving all determined temporally related data packets, said method further comprises:
concealing packet loss; and
mixing temporally related packets including concealed packet loss.

5. The method of claim 1, wherein said method further comprises the step of prioritizing data streams, and determining the optimizing waiting time based on said prioritization.

6. The method of claim 5, wherein said method comprises prioritizing data streams based on speech detection.

7. The method of claim 6, wherein said method further comprises the steps of:
determining a speech activity for each data packet of each data stream;
determining if a data stream is an active speaker or not;
if said data stream is an active speaker, selecting a first speech specific quality target, otherwise selecting a second speech specific quality target, wherein the second speech specific quality target is lower than the first speech specific quality target;

determining the optimized waiting time for temporally related data packets based on said selected quality targets of each said data packets.

8. The method of claim 1, wherein said step of mixing said decoded received data packets comprises:
   determining whether a previously set timer has expired;
   after determining that the set timer has not expired, determining if received packets are temporally related and originating from different data streams;
   determining if all determined temporally related data packets have arrived; and
   after determining that all determined temporally related media packets have arrived, clearing out timeout and mixing said determined temporally related packets to generate an outgoing data packet.

9. The method of claim 1, wherein
   the first data packet contains media having a duration of ptime units of time;
   determining the first maximum waiting time (T1_max) comprises calculating: T1_max=Ta+w+ptime, wherein Ta is an arrival time of the first data packet and w is a predetermined waiting time.

10. A mixing unit configured to mix received data packets, the mixing unit comprising:
    a receiver for receiving a first set of temporally related data packets comprising a first data packet belonging to a first one of N data streams and a second data packet belonging to a second one of the N data streams, wherein the second data packet is temporally related to the first data packet;
    a processor; and
    a memory, said memory comprising instructions executable by the processor, wherein the processor is operative to:
    determine, based on timing information associated with the received first data packet, a first maximum waiting time;
    determine, based on timing information associated with the received second data packet, a second maximum waiting time;
    determine an optimized waiting time for a second set of temporally related data packets based on said determined first and second maximum waiting times, wherein the processor is operative to determine the optimized waiting time based on said determined first and second maximum waiting times by determining whether the first maximum waiting time is greater than the second maximum waiting time and then setting the optimized waiting time for the second set of temporally related data packets to the greater of the first maximum waiting time and the second maximum waiting time; and
    mix at least a subset of said second set of temporally related data packets based on said determined optimized waiting time.

11. A mixing unit for mixing received data packets, the mixing unit comprising:
    a receiver for receiving a first set of temporally related data packets comprising a first data packet belonging to a first one of N data streams and a second data packet belonging to a second one of N data streams, wherein the second data packet is temporally related to the first data packet; and
    processing circuitry for
    determining, based on timing information associated with the first data packet, a first maximum waiting time;
    determining, based on timing information associated with the second data packet, a second maximum waiting time;
    determining an optimized waiting time for a second set of temporally related data packets based on said determined first and second maximum waiting times, wherein the processing circuitry is operative to determine the optimized waiting time based on said determined first and second maximum waiting times by determining whether the first maximum waiting time is greater than the second maximum waiting time and then setting the optimized waiting time for the second set of temporally related data packets to the greater of the first maximum waiting time and the second maximum waiting time; and
    mixing at least a subset of said second set of temporally related data packets based on said determined optimized waiting time.

12. A method performed by a network node of mixing received data packets from a plurality of incoming data streams in a packet switched network, said network node comprising a mixing unit, said method comprising:
    receiving a first set of temporally related data packets, wherein receiving the first set of temporally related data packets comprises: receiving a first data packet belonging to a first one of N data streams and receiving a second data packet belonging to a second one of the N data streams, wherein the second data packet is temporally related to the first data packet;
    after receiving the first data packet, calculating, based on timing information associated with the first data packet, a first maximum waiting time;
    after receiving the second data packet, calculating, based on timing information associated with the second data packet, a second maximum waiting time;
    determining an optimized waiting time for a second set of temporally related data packets based on said calculated first and second maximum waiting times, wherein determining the optimized waiting time based on said first and second maximum waiting times comprises setting the optimized waiting time for the second set of temporally related data packets to the greater of the first maximum waiting time and the second maximum waiting time; and
    controlling mixing of at least a subset of the second set of temporally related data packets based on said optimal waiting time.

13. The method of claim 12, wherein the method further comprises:
    measuring at least jitter for every received data packet of each of said plurality of incoming data streams;
    calculating the maximum waiting time for each said received data packet of each of said plurality of incoming data streams based on said measured jitter; and
    mixing, by said mixing unit, of at least a subset of said received data packets based at least on said calculated maximum waiting time.

14. The method of claim 12, wherein said step of calculating the maximum waiting time for each said received data packet of each of said plurality of incoming data streams comprises the further steps of:
    receiving a current data packet;
    extracting timing information for said received current data packet, said timing information comprising at least arrival time and a real time protocol time stamp for said data packet;

identifying a fastest data packet within a predetermined number of received data packets;

comparing timing information for said current data packet with timing information for said identified fastest data packet;

forming a representation of an estimated delay difference based on said comparison;

determining said maximum waiting time for said received current data packet based on said representation.

15. A computer program product comprising a non-transitory computer readable medium storing a computer program comprising instructions, which when executed by at least one processor, cause the at least one processor to perform the method of claim 12.

16. A network node for mixing received data packets from a plurality of incoming data streams, wherein the network node comprises:

a receiver for receiving a first set of temporally related data packets comprising a first data packet belonging to a first one of N data streams and receiving a second data packet belonging to a second one of the N data streams, wherein the second data packet is temporally related to the first data packet;

a processor; and a memory, said memory comprising instructions executable by the processor, whereby the processor is operative to:

calculate, based on timing information associated with the received first data packet, a first maximum waiting time;

calculate, based on timing information associated with the received second data packet, a second maximum waiting time;

determine an optimized waiting time for a second set of temporally related data packets based on said calculated first and second maximum waiting times, wherein the processor is operative to determine the optimized waiting time based on said first and second maximum waiting times by setting the optimized waiting time for the second set of temporally related data packets to the greater of the first maximum waiting time and the second maximum waiting time; and control mixing of at least a subset of the second set of temporally related data packets based on said optimal waiting time.

17. The network node of claim 16, wherein the network node further comprises communication circuitry comprising a transmitter and a receiver.

18. A computer program product comprising a non-transitory computer readable medium storing a computer program comprising instructions for:

receiving a first set of temporally related data packets, wherein receiving the first set of temporally related data packets comprises: receiving a first data packet belonging to a first one of N data streams and receiving a second data packet belonging to a second one of the N data streams, wherein the second data packet is temporally related to the first data packet;

after receiving the first data packet, calculating, based on timing information associated with the first data packet, a first maximum waiting time;

after receiving the second data packet, calculating, based on timing information associated with the second data packet, a second maximum waiting time;

determining an optimized waiting time for a second set of temporally related data packets based on said calculated first and second maximum waiting times, wherein determining the optimized waiting time based on said first and second maximum waiting times comprises setting the optimized waiting time for the second set of temporally related data packets to the greater of the first maximum waiting time and the second maximum waiting time; and controlling mixing of at least a subset of the second set of temporally related data packets based on said optimal waiting time.

\* \* \* \* \*